US008858336B2

(12) United States Patent
Sawano et al.

(10) Patent No.: US 8,858,336 B2
(45) Date of Patent: Oct. 14, 2014

(54) GAME APPARATUS HAVING GENERAL-PURPOSE REMOTE CONTROL FUNCTION

(71) Applicant: Nintendo Co., Ltd., Kyoto (JP)

(72) Inventors: Takao Sawano, Kyoto (JP); Hitoshi Yamazaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 14/187,360

(22) Filed: Feb. 24, 2014

(65) Prior Publication Data

US 2014/0171203 A1 Jun. 19, 2014

Related U.S. Application Data

(63) Continuation of application No. 13/020,872, filed on Feb. 4, 2011, now Pat. No. 8,696,462, which is a continuation of application No. 11/598,787, filed on Nov. 14, 2006, now Pat. No. 7,905,782.

(30) Foreign Application Priority Data

Aug. 2, 2006 (JP) ................................. 2006-211183

(51) Int. Cl.
*A63F 13/00* (2014.01)
*A63F 13/219* (2014.01)
*A63F 13/20* (2014.01)

(52) U.S. Cl.
CPC ................. *A63F 13/04* (2013.01); *A63F 13/06* (2013.01); *A63F 2300/1031* (2013.01); *A63F 2300/105* (2013.01)
USPC .................................. 463/39; 463/36; 463/40

(58) Field of Classification Search
USPC ................................................ 463/36, 39, 40
See application file for complete search history.

(56) References Cited

U.S. PATENT DOCUMENTS

| 5,437,463 A | 8/1995 | Fromm |
| 5,561,419 A | 10/1996 | Sasaki et al. |
| 5,569,085 A | 10/1996 | Igarashi et al. |

(Continued)

FOREIGN PATENT DOCUMENTS

| JP | 2-198299 | 8/1990 |
| JP | 3-74434 | 7/1991 |

(Continued)

OTHER PUBLICATIONS

U.S. Appl. No. 11/745,842, filed May 8, 2007 for "Methods and Apparatus for Using Illumination Marks for Spatial Pointing."

*Primary Examiner* — James S McClellan
(74) *Attorney, Agent, or Firm* — Nixon & Vanderhye, P.C.

(57) ABSTRACT

A game apparatus is capable of controlling infrared radiation emitters for radiating infrared light. The game apparatus executes game processing using imaging information on the infrared light obtained from an input device. The input device takes an image of the infrared light radiated by the infrared radiation emitters, and also receives an input from a user. The game apparatus comprises pattern storage means; selection means; and radiation control means. The pattern storage means stores at least one signal pattern of an infrared signal usable by a control target device. The selection means selects at least one of the at least one signal pattern stored by the pattern storage means, using the input received by the input device. The radiation control means causes the infrared radiation emitters to output an infrared signal of the signal pattern selected by the selection means.

8 Claims, 24 Drawing Sheets

(56) References Cited

U.S. PATENT DOCUMENTS

| | | | |
|---|---|---|---|
| 6,012,980 | A | 1/2000 | Yoshida et al. |
| 6,171,190 | B1 | 1/2001 | Thanasack et al. |
| 6,280,327 | B1 | 8/2001 | Leifer et al. |
| 6,400,480 | B1 | 6/2002 | Thomas |
| 6,496,122 | B2 | 12/2002 | Sampsell |
| 6,540,607 | B2 | 4/2003 | Mokris et al. |
| 6,811,489 | B1 | 11/2004 | Shimizu et al. |
| 6,812,881 | B1 | 11/2004 | Mullaly et al. |
| 6,821,206 | B1 | 11/2004 | Ishida et al. |
| 6,852,032 | B2 | 2/2005 | Ishino |
| 7,115,032 | B2 | 10/2006 | Cantu et al. |
| 7,774,155 | B2 | 8/2010 | Sato et al. |
| 8,187,098 | B2 * | 5/2012 | Koontz, II ............... 463/39 |
| 2005/0170889 | A1 | 8/2005 | Lum et al. |
| 2006/0046849 | A1 | 3/2006 | Kovacs |
| 2006/0205507 | A1 | 9/2006 | Ho |
| 2006/0264258 | A1 | 11/2006 | Zalewski et al. |
| 2006/0282873 | A1 | 12/2006 | Zalewski et al. |
| 2007/0021208 | A1 | 1/2007 | Mao et al. |
| 2007/0049374 | A1 | 3/2007 | Ikeda et al. |
| 2007/0050597 | A1 | 3/2007 | Ikeda |
| 2007/0052177 | A1 | 3/2007 | Ikeda et al. |
| 2007/0060391 | A1 | 3/2007 | Ikeda et al. |
| 2007/0066394 | A1 | 3/2007 | Ikeda et al. |
| 2007/0072680 | A1 | 3/2007 | Ikeda |
| 2007/0093291 | A1 | 4/2007 | Hulvey |
| 2008/0015017 | A1 | 1/2008 | Ashida et al. |
| 2008/0039202 | A1 | 2/2008 | Sawano et al. |
| 2009/0005166 | A1 | 1/2009 | Sato |
| 2011/0124414 | A1 | 5/2011 | Sawano et al. |

FOREIGN PATENT DOCUMENTS

| | | |
|---|---|---|
| JP | 6-50758 | 2/1994 |
| JP | 6-154422 | 6/1994 |
| JP | 6-190144 | 7/1994 |
| JP | 8-305355 | 11/1996 |
| JP | 10-99542 | 4/1998 |
| JP | 11-506857 | 6/1999 |
| JP | 3080103 | 6/2001 |
| JP | 2002-202843 | 7/2002 |
| JP | 2002-232549 | 8/2002 |
| JP | 2005-040493 | 2/2005 |
| JP | 2005-063230 | 3/2005 |
| WO | WO 99/58214 | 11/1999 |
| WO | 02/17054 | 2/2002 |

* cited by examiner

| DEVICE | INSTRUCTION | SIGNAL |
|---|---|---|
| DEVICE A (TV 2) | POWER ON/OFF | SIGNAL PATTERN A |
| | VOLUME +1 | SIGNAL PATTERN B |
| | ⋮ | ⋮ |
| DEVICE B (REMOTE CONTROL CAR 71) | ACCELERATION ON | SIGNAL PATTERN C |
| | ANGLE OF STEERING WHEEL = $\theta 1$ | SIGNAL PATTERN E |
| | ANGLE OF STEERING WHEEL = $\theta 2$ | SIGNAL PATTERN F |
| | ⋮ | ⋮ |
| DEVICE C | INSTRUCTION A | SIGNAL PATTERN G |
| ⋮ | ⋮ | ⋮ |

631

GAME APPARATUS HAVING GENERAL-PURPOSE REMOTE CONTROL FUNCTION

CROSS-REFERENCES TO RELATED APPLICATIONS

This application is a continuation of U.S. application Ser. No. 13/020,872, filed Feb. 4, 2011, now allowed, which is a continuation of U.S. application Ser. No. 11/598,787, filed Nov. 14, 2006, now U.S. Pat. No. 7,905,782, which claims the benefit of the disclosure of Japanese Patent Application No. 2006-211183, filed on Aug. 2, 2006, each of which are hereby incorporated by reference in their entirety.

BACKGROUND

1. Field of the Technology

The present technology relates to a game apparatus having a general-purpose remote control function, and more particularly to a game apparatus having a general-purpose remote control function, which is capable of remotely controlling a remote-controllable device for general purposes.

2. Description of the Background Art

Conventionally, an exemplary technology for an apparatus having a general-purpose remote control function is disclosed in patent document 1 (Japanese Laid-Open Patent Publication No. 2-198299). Patent document 1 discloses a remote control transmitter capable of remotely controlling different types of devices produced by different manufacturers. This remote control transmitter reads, from a memory which stores data on the different types of devices produced by different manufacturers, data on a specific type of device, and thus remotely controls the device.

The remote control transmitter disclosed in patent document 1 merely has a function of remotely controlling the different types of devices produced by different manufacturers. Such a remote control transmitter is not usable for a game apparatus, in which means for transmitting data for remote control is also used for other purposes. Therefore, in order to control a remote-controllable device while a game is being played, the player needs to leave his/her hand or the like from the input device for the game, and picks up a remote control transmitter for the device. This is very inefficient.

SUMMARY

Therefore, a feature of the present technology is to provide a game apparatus including an input device which is capable of operating a device other than the game apparatus.

The present technology has the following features to attain the above. The reference numerals, additional descriptions and the like in parentheses in this section of the specification indicate the correspondence with the embodiments described later for easier understanding of the present technology, and do not limit the present technology in any way.

According to a first aspect is directed to a game apparatus (3) for executing game processing. The game apparatus is capable of controlling infrared radiation means (markers 6R and 6L) for radiating infrared light. The game apparatus executes the game processing using imaging information (marker coordinate sets) on the infrared light obtained from an input device (controller 5). The input device takes an image of the infrared light radiated by the infrared radiation means and receives an input from a user. The game apparatus comprises pattern storage means (flash memory 18), selection means (CPU 10 or the like for executing step S11, S44, S57 or S79; hereinafter, only the step number of the corresponding processing will be described in this section of the specification), and radiation control means (S12, S45, S58 or S80). The pattern storage means stores at least one signal pattern of an infrared signal usable by a control target device. The selection means selects at least one of the at least one signal pattern stored by the pattern storage means. The radiation control means causes the infrared radiation means to output an infrared signal of the signal pattern selected by the selection means.

According to a second aspect, the signal pattern may be selected using the input received by the input device.

According to a third aspect, the infrared signal may represent at least one of an image and a sound to be reproduced by the control target device.

According to a fourth aspect, the infrared signal may represent an instruction for causing the control target device to perform a predetermined motion.

According to a fifth aspect, the control target device may be a display device (TV 2) connected to the game apparatus for displaying a game image obtained as a result of the game processing. When a predetermined button provided in an input device is operated, the selection means selects a signal pattern for turning on the display device.

According to a sixth aspect, the game apparatus may further comprise motion determination means (S61) for determining a motion of a character appearing in a game space generated by the game processing, using the input used for selecting the signal pattern.

According to a seventh aspect, the game apparatus may further comprise display control means (S46) for causing a display device to display an image representing the input used for selecting the signal pattern.

According to an eighth aspect, the game apparatus may further comprise input information storage means (S43) and game data determination means (S48). The input information storage means stores input history data (635) representing a history of inputs used for selecting the signal pattern. The game data determination means determines game data (race course data 636) to be used for the game processing based on the input history data.

According to a ninth aspect, the game apparatus may further comprise motion determination means (S61) for determining a motion of a character appearing in a game space, using the input received by the input device. At this point, the selection means selects a signal pattern using the input used for determining the motion of the character.

According to a tenth aspect, the game apparatus may further comprise input information storage means (S53) for storing input history data (635) representing a history of inputs used for determining the motion of the character. At this point, the selection means selects a signal pattern based on the input history data.

According to an eleventh aspect, the game apparatus may further comprise game processing means (S61) for executing the game processing using the imaging information on the infrared light radiated by the infrared radiation means.

According to a twelfth aspect, the game apparatus may further comprise mode switching means (S3, S8) and game processing means (S9). The mode switching means switches a device operation mode and a game processing mode to each other at a predetermined timing. The game processing means executes the game processing using the imaging information only in the game processing mode. At this point, the selection means selects a signal pattern only in the device operation mode. The radiation control means continuously causes the infrared radiation means to output the infrared light in the game processing mode.

According to a thirteenth aspect, in the device operation mode, a part of a plurality of buttons provided in the input device may be each associated with a signal pattern to be selected by the selection means when the respective button is operated. At this point, the mode switching means switches the device operation mode to the game processing mode under at least one of the condition that there has been no input to any button provided in the input device for a predetermined time duration and the condition that a button which is not associated with any signal pattern has been operated.

The present technology may be provided as a storage medium having stored thereon a game program which is executable by a computer of a game apparatus to realize each means of the game apparatus.

A fourteenth aspect is directed to a game system including an input device (controller 5), having a plurality of types of operation keys and a wireless communication function, and a game apparatus (3) wirelessly communicable with the input device. The game system comprises an infrared radiation device (markers 6R and 6L) connected to the game apparatus. The game apparatus includes a memory (flash memory 18) and infrared control means (CPU 10, etc.). The memory stores at least one signal pattern of infrared light for controlling a control target device. The infrared control means, in accordance with key information corresponding to an operation key which is transmitted from the input device by wireless communication, reads a signal pattern corresponding to the key information from the memory and controls the infrared radiation device to output the infrared light based on the signal pattern.

According to a fifteenth aspect, the input device may include an imaging camera and position information transmission means. The imaging camera takes an image of the infrared light which is output from the infrared radiation device. The position information transmission means transmits position information on the position of the infrared light on an image taken by the imaging camera to the game apparatus. In this case, the game apparatus includes game processing execution means (S61) for executing game processing based on the position information and the key information received from the input device. The infrared control means reads a signal pattern from the memory in accordance with the state of the game processing, and controls the infrared radiation device to output the infrared light based on the signal pattern.

According to the first aspect, the imaging information on the infrared light which is output from the infrared radiation means is obtained by the input device, and this imaging information is used for the game processing. Therefore, the player can execute the game processing by operating the input device. In addition, the radiation control means can transmit various data to the control target device by radiating an infrared signal of a signal pattern selected by the selection means. According to the first aspect, a game apparatus having a general-purpose remote control function capable of operating another device in addition to executing the game processing using the input device can be provided.

According to the second aspect, the signal pattern of the infrared signal to be output from the infrared radiation means is selected by an input to the input device. Therefore, the player can transmit various data to the control target device by operating the input device.

According to the third aspect, the game apparatus can cause the control target device to display a desired image or output a desired sound by transmitting data on the image or the sound to the control target device.

According to the fourth aspect, the game apparatus can cause the control target device to perform a desired motion by transmitting such an instruction to the control target device.

According to the fifth aspect, the display device for displaying the game image can be turned on using the input device. Therefore, the player only needs to operate the input device to start the game. The trouble of operating a plurality of remote controls is eliminated.

According to the sixth aspect, a motion of a character in the virtual game world can be associated with a motion of a control target device in the real world. This makes the game more amusing.

According to the seventh aspect, the player can visually check the operation particulars performed to control the control target device. This makes it easier to operate the control target device.

According to the eighth aspect, a setting regarding the game in the virtual game world can be associated with a motion of the control target device in the real world. This makes the game more amusing.

According to the ninth aspect, a motion of the control target device in the real world can be associated with a motion of a character in the virtual game world. This makes the game more amusing.

According to the tenth aspect, a motion of a character in the game world can be reproduced by the control target device in the real world.

According to the eleventh aspect, even while the game processing is being executed using the imaging information, another device can be operated using the input device.

According to the twelfth aspect, when the game processing is executed using the imaging information obtained by taking an image of the infrared radiation means using the input device, the infrared radiation means does not output any infrared signal and continuously outputs infrared light. The input device can obtain accurate imaging information by taking an image of the infrared radiation means in a secure state. Therefore, the game processing can be executed more accurately.

According to the thirteenth aspect, the game apparatus determines whether or not to control the control target device and automatically changes the device operation mode to the game processing mode. Therefore, the player does not need to switch the mode, which alleviates the trouble of performing operations before starting the game.

According to the fourteenth aspect, the infrared control means controls the infrared radiation device to output an infrared signal in accordance with an operation on the input device to control a control target device. Therefore, the player can operation another device using the input device.

According to the fifteenth aspect, the game processing is executed in accordance with the position information on the infrared light obtained by the input device. In addition, the infrared light is output from the infrared radiation device in accordance with the state of the game processing. Therefore, the player can control another device during the game operation performed using the input device.

These and other features, aspects and advantages of the present technology will become more apparent from the following detailed description of the present technology when taken in conjunction with the accompanying drawings.

DESCRIPTION OF THE PREFERRED EMBODIMENTS (Overall Structure of the System)

Figure 1:
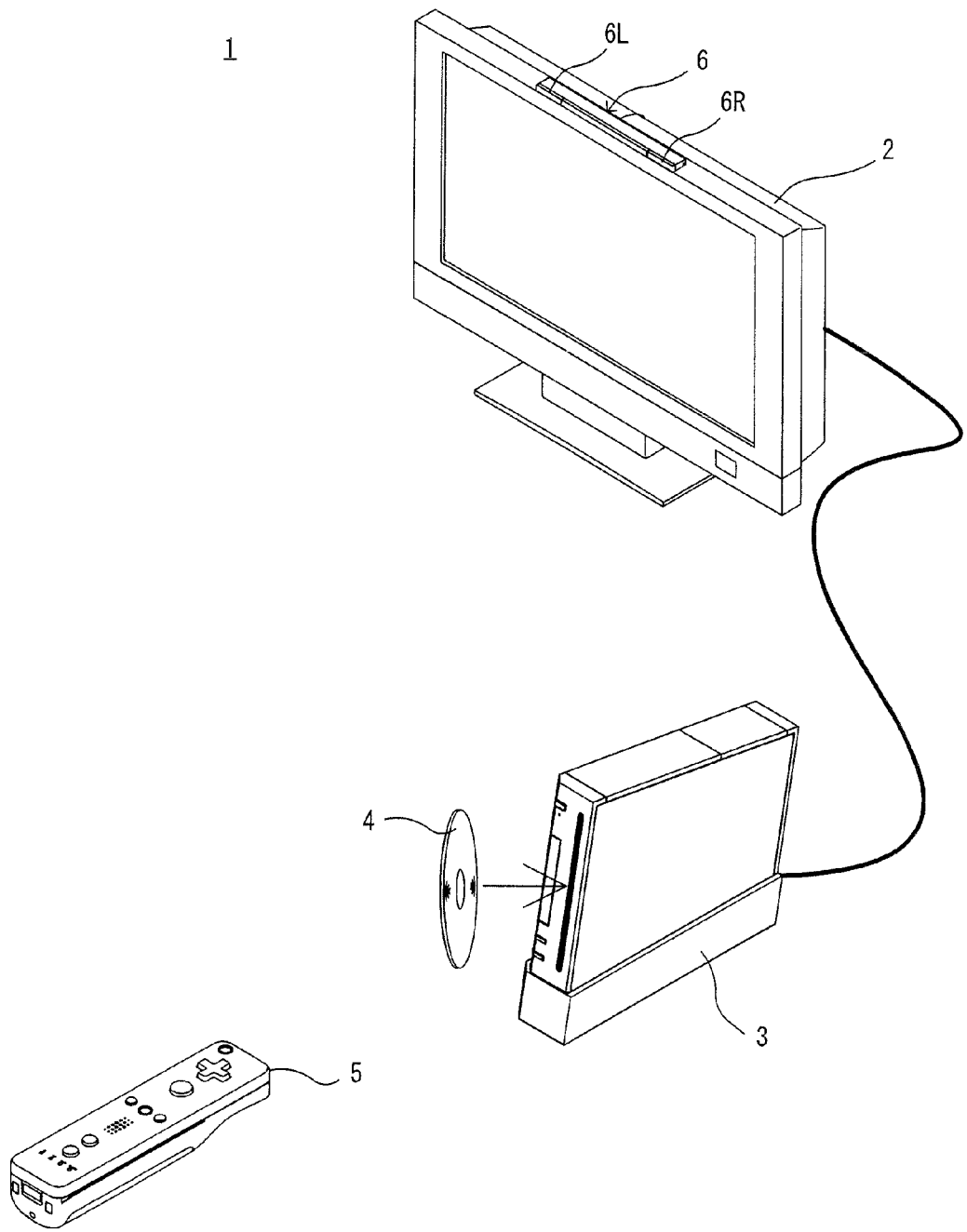
FIG. 1 is an external view of a game system including a game apparatus 3 according to one embodiment.

A game system 1 including a game apparatus according to one embodiment will be described with reference to FIG. 1. FIG. 1 is an external view of the game system 1. Hereinafter, a game apparatus and a game program according to the present technology will be described using a game apparatus 3 of an installation type as an example. As shown in FIG. 1, the game system 1 includes a television receiver (hereinafter, referred to simply as the "TV") 2, the game apparatus 3, an optical disc 4, a controller 5, and a sensor bar 6. With the game system 1, game processing is performed by the game apparatus 3 based on a game operation using the controller 5, while a control target device (for example, the TV 2) is controlled in accordance with an operation using the controller 5. With the game system 1, the controller 5 can be used for the game operation and also as a remote control for a control target device which is different from the game apparatus 3.

To the game apparatus 3, the optical disc 4 as an example of an exchangeable information storage medium is detachably inserted. The optical disc 4 has stored thereon a game program to be executed by the game apparatus 3. The game apparatus 3 has an insertion opening for the optical disc 4 in a front surface thereof. The game apparatus 3 executes game processing by reading and executing the game program stored on the optical disc 4 inserted through the insertion opening.

The TV 2 is connected to the game apparatus 3 via a connection cord. The TV 2 is a display device such as a home-use television receiver or the like. The TV 2 displays a game image obtained as a result of the game processing executed by the game apparatus 3. The sensor bar 6 is provided in the vicinity of the TV 2 (in FIG. 1, above a screen of the TV 2). The sensor bar 6 includes two markers 6R and 6L at both ends thereof. Specifically, the markers 6R and 6L each include one or more infrared LEDs, and output infrared light forward from the TV 2. The sensor bar 6 is connected to the game apparatus 3, and the game apparatus 3 is capable of controlling each of the infrared LEDs included in the sensor bar 6 to be on or off. In this embodiment, the markers 6R and 6L are used for the game operation using the controller 5 and also used as means for transmitting an infrared signal for controlling the control target device (for example, the TV 2).

The controller 5 is an input device for providing the game apparatus 3 with operation data which represents operation particulars made on the controller 5. The controller 5 and the game apparatus 3 wirelessly communicate with each other. In this embodiment, the Bluetooth (registered trademark) technology is used for such wireless communication. The controller 5 transmits the operation data to the game apparatus 3, and the game apparatus 3 executes the game processing in accordance with the received operation data. The controller 5 also includes imaging means (imaging information calculation section 35 shown in FIG. 6) for taking an image of the markers 6R and 6L and acceleration detection means (acceleration sensor 37), in addition to operation buttons. As described later in detail, the game apparatus 3 receives data obtained by the imaging means and the acceleration detection means as operation data, and thus can calculate a position, posture or motion of the controller 5. Owing to this, the player can perform a game operation of moving the controller 5 itself as well as an operation made on the control buttons. The game apparatus 3 transmits control data for controlling the motion of the controller 5. In accordance with the received control data, the controller 5 performs a motion of, for example, outputting a sound from a speaker provided in the controller 5 or lighting up an LED provided in the controller 5. In another embodiment, the controller 5 and the game apparatus 3 may be connected to each other in a wired manner.

(Structure of the Game Apparatus)

Figure 2:
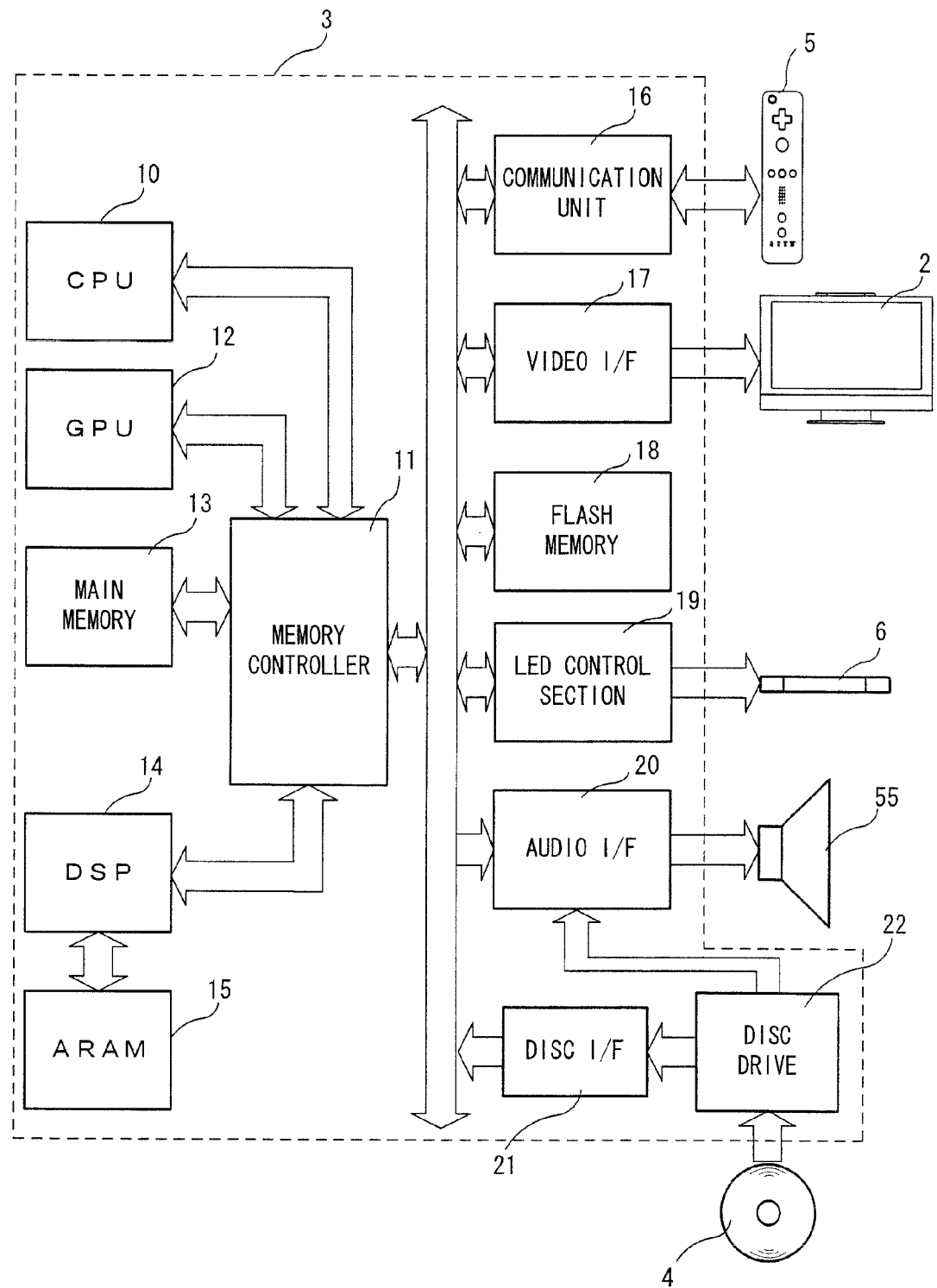
FIG. 2 is a functional block diagram of the game apparatus 3.

Next, with reference to FIG. 2, a structure of the game apparatus 3 will be described. FIG. 2 is a functional block diagram of the game apparatus 3.

As shown in FIG. 2, the game apparatus 3 includes, for example, a CPU (central processing unit) 10 for executing various programs. The CPU 10 executes a start program stored on a boot ROM (not shown) to, for example, initialize memories including a main memory 13, and then executes a game program stored on the optical disc 4 to perform game processing or the like in accordance with the game program. The CPU 10 is connected to a GPU (Graphics Processing Unit) 12, the main memory 13, a DSP (Digital Signal Processor) 14, and an ARAM (Audio RAM) 15 via a memory controller 11. The memory controller 11 is connected to a communication unit 16, a video I/F (interface) 17, a flash memory 18, an LED control section 19, an audio I/F 20 and a disc I/F 21 via a predetermined bus. The video I/F 17 is connected to the TV 2, the LED control section 19 is connected to the sensor bar 6, the audio I/F 20 is connected to a speaker 55 and a disc drive 22, and the disc I/F 21 is connected to the disc drive 22.

The GPU 12 performs image processing based on an instruction from the CPU 10. The GPU 12 includes, for example, a semiconductor chip for performing calculation processing necessary for displaying 3D graphics. The GPU 12 performs the image processing using a memory dedicated for image processing (not shown) and a part of the storage area of the main memory 13. The GPU 12 generates game image data and a movie to be displayed on the TV 2 using such memories, and outputs the generated data or movie to the TV 2 via the memory controller 11 and the video I/F 17 as necessary.

The main memory 13 is a storage area used by the CPU 10, and stores a game program or the like necessary for processing performed by the CPU 10 as necessary. For example, the main memory 13 stores a game program read from the optical disc 4 by the CPU 10, various types of data or the like. The game program, the various types of data or the like stored on the main memory 13 are executed by the CPU 10.

The DSP 14 processes sound data or the like generated by the CPU 10 during the execution of the game program. The DSP 14 is connected to the ARAM 15 for storing the sound data or the like. The ARAM 15 is used when the DSP 14 performs predetermined processing (for example, storage of the game program or sound data already read). The DSP 14 reads the sound data stored on the ARAM 15 and outputs the sound data to the speaker 55 via the memory controller 11 and the audio I/F 20.

The memory controller 11 comprehensively controls data transfer, and is connected to the communication unit 16, the flash memory 18, the LED control section 19, and the various I/Fs 17, 20 and 21. The communication unit 16 receives operation data from the controller 5, and outputs the received operation data to the CPU 10 via the memory controller 11. When control data for controlling the motion of the controller 5 is transmitted to the controller 5, the control data is output to the communication unit 16. The communication unit 16 transmits the input control data to the controller 5. The video I/F 17 is connected to the TV 2. The image data generated by the GPU 12 is output to the TV 2 via the video I/F 17. The flash memory 18 acts as a backup memory for fixedly storing data such as saved data or the like. The game apparatus 3 can reproduce a game state in the past and display the game image on the TV 2 using the saved data stored on the flash memory 18. The LED control section 19 is connected to the infrared LEDs included in the sensor bar 6. For lighting up the infrared LEDs, the CPU 10 instructs the LED control section 19 to supply power. In accordance with the instruction, the LED control section 19 supplies power to the infrared LEDs, and thus the infrared LEDs are lit up. The audio I/F 20 is connected to the speaker 55 built in the TV 2. The sound data read by the DSP 14 from the ARAM 15 or sound data directly output from the disc drive 22 is output from the speaker 55. The disc I/F 21 is connected to the disc drive 22. The disc drive 22 reads data stored at a predetermined reading position of the optical disc 4, and outputs the data to the disc I/F 21 and the audio I/F 20.

The game apparatus 3 includes a network communication section (not shown) and thus is connected to a network such as the Internet or the like. The game apparatus 3 can obtain various data from outside or transmit data to the outside via the network communication section.

(Structure of the Controller)

Figure 3:
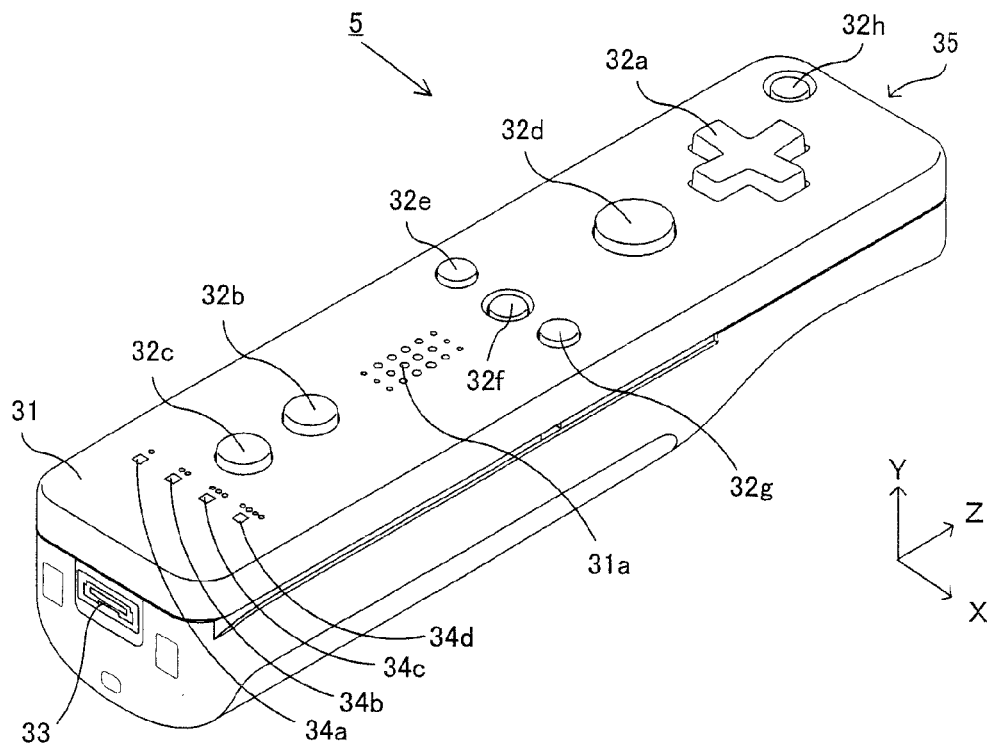
FIG. 3 is an isometric view of a controller 5 seen from the top rear side thereof.
Figure 4:
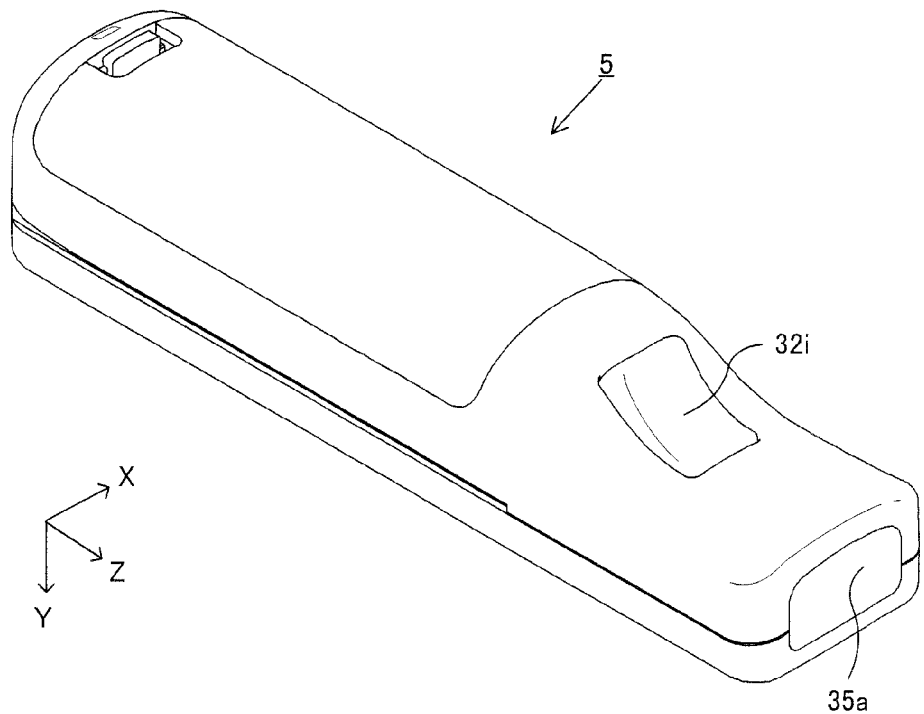
FIG. 4 is an isometric view of the controller 5 seen from the bottom front side thereof.

With reference to FIG. 3 through FIG. 7, the controller 5 will be described. FIG. 3 and FIG. 4 are external isometric views of the controller 5. FIG. 3 is an isometric view of the controller 5 seen from the top rear side thereof. FIG. 4 is an isometric view of the controller 5 seen from the bottom front side thereof.

As shown in FIG. 3 and FIG. 4, the controller 5 includes a housing 31 formed by plastic molding or the like. The housing 31 has a generally parallelepiped shape extending in a longitudinal or front-rear direction (Z-axis direction shown in FIG. 3). The overall size of the housing 31 is small enough to be held by one hand of an adult or even a child. The player can perform a game operation by, for example, pressing buttons provided in the controller 5 or moving the controller 5 itself to change the position or posture thereof. For example, the player can perform an operation on an operation target by rotating the controller 5 around an axis in the longitudinal direction thereof or changing the position indicated by the controller 5 on the display screen. The "position indicated by the controller 5 on the display screen" ideally refers to a position at which a phantom straight line extending from a front end of the controller 5 in the longitudinal direction crosses the display screen of the TV 2. However, the "position indicated by the controller 5 on the display screen" does not need to be exactly such a position, but may be a position in the vicinity thereof which can be calculated by the game apparatus 3. Hereinafter, such a position will be sometimes referred to as an "indicated position" or an "indicated position by the controller 5". The longitudinal direction of the controller 5 (housing 31) will be sometimes referred to as an "indicated direction" or an "indicated direction by the controller 5".

The housing 31 has a plurality of operation buttons. As shown in FIG. 3, provided on a top surface of the housing 31 are a cross key 32*a*, a first button 32*b*, a second button 32*c*, an A button 32*d*, a minus button 32*e*, a home button 32*f*, a plus button 32*g*, and a power button 32*h*. The power button 32*h* is for remotely turning the game apparatus 3 on or off. As shown in FIG. 4, on a bottom surface of the housing 31, a recessed portion is formed. On a rear slope surface of the recessed portion, a B button 32*i* is provided. These buttons 32*a* through 32*i* are assigned various functions in accordance with the game program executed by the game apparatus 3. The home button 32*f* and the power button 32*h* have a surface thereof buried in the top surface of the housing 31, so as not to be inadvertently pressed by the player.

On a rear surface of the housing 31, a connector 33 is provided. The connector 33 is used for connecting the controller 5 to another device. For example, a sub control unit including a stick inclinable at any angle in the range of 360 degrees may be connected to the connector 33 via a cable. In this way, for example, a direction may be input in accordance with an operation on the sub control unit, while a predetermined position on the screen may be indicated by an operation made on the controller 5. By using such a sub control unit connected to the connector 33 via a cable, an operation of inputting a direction while moving the controller 5 can be freely performed.

In a rear part of the top surface of the housing 31, a plurality of LEDs (in FIG. 3, four LEDs 34a through 34d) are provided. The controller 5 is assigned a controller type (number) so as to be distinguishable from the other controllers 5. The LEDs 34 are used for, for example, informing the player of the controller type which is currently set to controller 5 that he/she is using, or for informing the player of the remaining battery amount. Specifically, when the controller 5 transmits the operation data to the game apparatus 3, one of the plurality of LEDs 34a through 34d corresponding to the controller type is lit up.

Figure 5A:
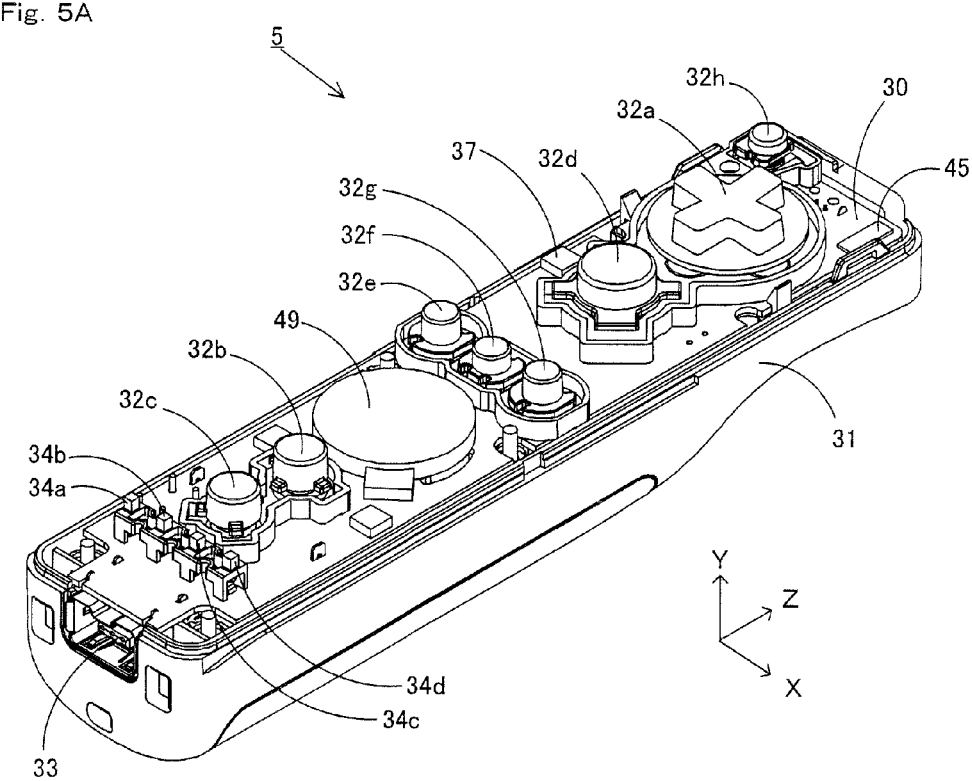
FIG. 5A shows an internal structure of the controller 5.
Figure 5B:
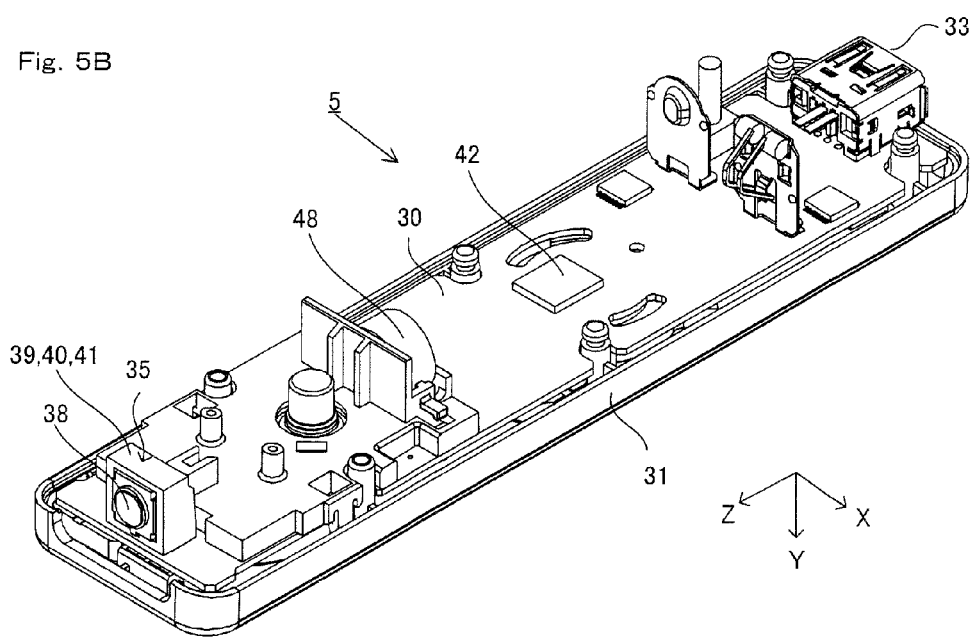
FIG. 5B shows an internal structure of the controller 5.

The controller 5 includes the imaging information calculation section 35 (FIG. 5B). As shown in FIG. 4, a light incident face 35a of the imaging information calculation section 35 is provided on a front surface of the housing 31. The light incident face 35a is formed of a material which allows infrared light from the markers 6R and 6L to be at least transmitted therethrough.

On the top surface of the housing 31, sound holes 31a are formed between the first button 32b and the home button 32f for releasing the sound outside from a speaker 49 (FIG. 5A) built in the controller 5.

With reference to FIG. 5A and FIG. 5B, an internal structure of the controller 5 will be described. FIG. 5A and FIG. 5B illustrate an internal structure of the controller 5. FIG. 5A is an isometric view illustrating a state where an upper casing (a part of the housing 31) of the controller 5 is removed. FIG. 5B is an isometric view illustrating a state where a lower casing (a part of the housing 31) of the controller 5 is removed. FIG. 5B shows a reverse side of a substrate 30 shown in FIG. 5A.

As shown in FIG. 5A, the substrate 30 is fixed inside the housing 31. On a top main surface of the substrate 30, the operation buttons 32a through 32h, the LEDs 34a through 34d, the acceleration sensor 37, an antenna 45, the speaker 49 and the like are provided. These elements are connected to a microcomputer 42 (see FIG. 5B) via lines (not shown) formed on the substrate 30 and the like. In this embodiment, the acceleration sensor 37 is provided off the center line of the controller 5 in the X-axis direction. This makes it easier to calculate the motion of the controller 5 when the controller is rotated around the Z axis as the rotation center. A wireless module 44 (FIG. 6) and the antenna 45 allow the controller 5 to act as a wireless controller.

As shown in FIG. 5B, at a front edge of a bottom main surface of the substrate 30, the imaging information calculation section 35 is provided. The imaging information calculation section 35 includes an infrared filter 38, a lens 39, an imaging element 40 and an image processing circuit 41 located in this order from the front surface of the controller 5. These elements are attached to the bottom main surface of the substrate 30.

On the bottom main surface of the substrate 30, the microcomputer 42 and a vibrator 48 are provided. The vibrator 48 may be, for example, a vibration motor or a solenoid, and is connected to the microcomputer 42 via lines provided on the substrate 30 and the like. The controller 5 is vibrated by an actuation of the vibrator 48 based on an instruction from the microcomputer 42, and the vibration is conveyed to the player holding the controller 5. Thus, a so-called vibration-responsive game is realized. In this embodiment, the vibrator 48 is provided in a front part of the housing 31. Since the vibrator 48 is provided closer to a front end than the center of the controller 5, the vibration of the vibrator 48 can vibrate the entire controller 5 more significantly. The connector 33 is attached at a rear edge of the main bottom surface of the substrate 30. In addition to the elements shown in FIG. 5A and FIG. 5B, the controller 5 includes a quartz oscillator for generating a reference clock of the microcomputer 42, an amplifier for outputting an audio signal to the speaker 49, and the like.

The shape of the controller 5, the shape of the operation buttons, and the number, position or the like of the acceleration sensor and the vibrator shown in FIG. 3 through FIG. 5B are merely exemplary, and may be altered without departing from the scope of the present technology. The position of the imaging information calculation section 35 (the light incident face 35a of the imaging information calculation section 35) in the controller 5 does not need to be on the front surface of the housing 31, and may be on another surface as long as light can enter from the outside of the housing 31. In this case, the "indicated direction by the controller 5" is the imaging direction of the imaging element 40, more specifically a direction vertical to the light incident face.

Figure 6:
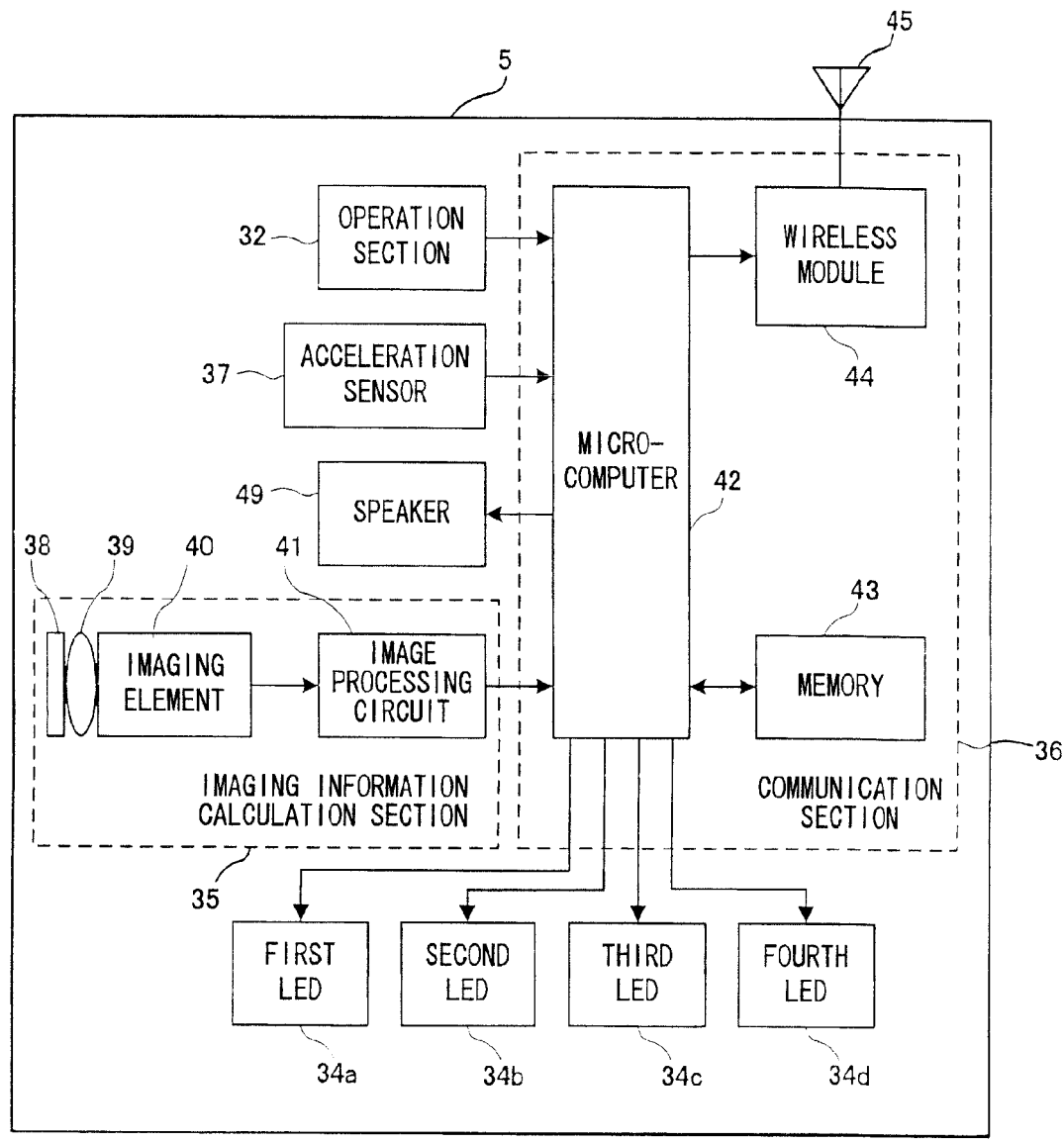
FIG. 6 is a block diagram showing a structure of the controller 5.

FIG. 6 is a block diagram showing a structure of the controller 5. The controller 5 includes the operation section 32 (operation buttons), the imaging information calculation section 35, the communication section 36, the acceleration sensor 37, the speaker 49, and the LEDs 34a through 34d.

The operation section 32 corresponds to the above-described operation buttons 32a through 32i, and outputs data representing an input state of each of the operation buttons 32a through 32i (whether each of the operation buttons 32a through 32i has been pressed or not) to the microcomputer 42 of the communication section 36.

The imaging information calculation section 35 is a system for analyzing image data taken by imaging means, distinguishing an area having a high brightness in the image data, and calculating the center of gravity, the size and the like of the area. The imaging information calculation section 35 has, for example, a maximum sampling period of about 200 frames/sec., and therefore can trace and analyze even a relatively fast motion of the controller 5.

The imaging information calculation section 35 includes the infrared filter 38, the lens 39, the imaging element 40 and the image processing circuit 41. The infrared filter 38 allows only infrared light to pass therethrough, among light incident on the front surface of the controller 5. The lens 39 collects the infrared light which has been transmitted through the infrared filter 38 and causes the infrared light to be incident on the imaging element 40. The imaging element 40 is a solid-state imaging device such as, for example, a CMOS sensor or a CCD sensor. The imaging element 40 receives the infrared light collected by the lens 39 and outputs an image signal. The markers 6R and 6L of the sensor bar 6 located in the vicinity of the display screen of the TV 2 each include an infrared LED for outputting infrared light forward from the TV 2. The provision of the infrared filter 38 allows the imaging element 40 to receive only the infrared light transmitted through the infrared filter 38 to generate image data. Therefore, the image of each of the markers 6R and 6L can be taken more accurately. Hereinafter, an image taken by the imaging element 40 will be referred to as a "taken image". The image data generated by the imaging element 40 is processed by the image processing circuit 41. The image processing circuit 41 calculates the positions of imaging targets (the markers 6R and 6L) in the taken image. Hereinafter, a method for calculating the positions of the imaging targets will be described.

When the taken image is input from the imaging element 40 to the image processing circuit 41, the image processing circuit 41 calculates a coordinate set representing the position of each of areas in the taken image which match a predetermined condition. Here, the predetermined condition is a condition for specifying an image of an imaging target (target image). A specific predetermined condition is that the area has a brightness of a predetermined value or greater (a high luminance area) and has a size within a predetermined size range. The predetermined condition only needs to be a condition for specifying an imaging target, and in another embodiment, may include a condition regarding the color of the image.

For calculating the position of the target image, the image processing circuit 41 specifies high brightness areas described above, from the areas in the taken image, as candidates for the target image. The reason is that a target image appears as a high brightness area in the image data of the taken image. Next, based on the size of each specified high brightness area, the image processing circuit 41 executes determination processing of determining whether or not each of the high brightness areas is a target image. The taken image may include images other than images of the markers 6R and 6L as the target images, due to sunlight coming through a window or light of a fluorescent lamp. In this case, the images other than the images of the markers 6R and 6L also appear as high brightness areas. The above-mentioned determination processing is executed in order to distinguish the images of the markers 6R and 6L as the target images from the other images, so that the target images are accurately specified. Specifically, it is determined whether or not each specified high brightness area has a size within a predetermined size range. When the high brightness area has a size within the predetermined size range, such an area is determined to represent a target image; whereas when the high brightness area has a size outside the predetermined size range, such an area is determined to represent an image other than a target image.

The image processing circuit 41 calculates the position of a high brightness area which is determined to represent a target image as a result of the determination. Specifically, the image processing circuit 41 calculates the position of the center of gravity of the high brightness area. The position of the center of gravity can be calculated in a scale more detailed than the resolution of the imaging element 40. For example, even when the resolution of a taken image taken by the imaging element 40 is 126×96, the position of the center of gravity is calculated at a scale of 1024×768. The coordinate set of the position of the center of gravity is represented by integers of (0, 0) to (1024, 768). Positions in the taken image are represented by a coordinate system (X-Y coordinate system), in which the upper left corner of the taken image is the origin, the downward direction from the origin is a positive Y-axis direction, and the rightward direction from the origin is a positive X-axis direction.

As described above, the image processing circuit 41 calculates the coordinate set representing the position of each of areas in the taken image which match the predetermined condition. The image processing circuit 41 outputs the calculated coordinate set to the microcomputer 42 of the communication section 36. Data on the coordinate set is transmitted to the game apparatus 3 as operation data by the microcomputer 42. Hereinafter, such a coordinate set will be referred to as a "marker coordinate set". Since the marker coordinate set varies in accordance with the direction (posture) or position of the controller 5 itself, the game apparatus 3 can calculate the direction or position of the controller 5 using the marker coordinate set.

Returning to FIG. 6, the acceleration sensor 37 detects an acceleration (including acceleration of gravity) of the controller 5. Namely, the acceleration sensor 37 detects a force (including the force of gravity) applied to the controller 5. The acceleration sensor 37 detects a value of the acceleration in a linear direction along a sensing axis among the accelerations acting on a detection section of the acceleration sensor 37. For example, in the case of a multi-axial (at least two-axial) acceleration sensor, an acceleration of a component along each axis (linear acceleration) is detected as an acceleration acting on the detection section of the acceleration sensor. For example, a three-axial or two-axial acceleration sensor 37 may be available from Analog Devices, Inc. or STMicroelectronics N.V.

In this embodiment, the acceleration sensor 37 detects a linear acceleration in each of an up-down direction with respect to the controller 5 (Y-axis direction shown in FIG. 3), a left-right direction with respect to the controller 5 (X-axis direction shown in FIG. 3), and a front-rear direction with respect to the controller 5 (Z-axis direction shown in FIG. 3). Since the acceleration sensor 37 detects an acceleration in the linear direction along each axis, the output from the acceleration sensor 37 represents a value of the linear acceleration along each of the three axes. Namely, the detected acceleration is represented as a three-dimensional vector in an x-y-z coordinate system which is set with respect to the controller 5. Data representing the acceleration detected by the acceleration sensor 37 (acceleration data) is output to the communication section 36. In this embodiment, the communication section 36 of the controller 5 outputs acceleration data to the game apparatus 3 at a constant interval (for example, every 0.5 ms). The game apparatus 3 can calculate the moving direction or the inclination (posture) of the controller 5 based on the acceleration data. Since the acceleration sensor 37 detects a linear component of acceleration along each of the axes, the game apparatus 3 cannot directly detect the moving direction or the inclination of the controller 5. The moving direction or the inclination of a device having the acceleration sensor 37 mounted thereon is calculated by executing predetermined calculation processing on the acceleration detected for each axis of the acceleration sensor 37.

The communication section 36 includes the microcomputer 42, a memory 43, the wireless module 44 and the antenna 45. The microcomputer 42 controls the wireless module 44 for wirelessly transmitting the data obtained by the microcomputer 42 while using the memory 43 as a storage area during processing.

Data which is output from the operation section 32, the imaging information calculation section 35, and the acceleration sensor 37 to the microcomputer 42 is temporarily stored on the memory 43. The wireless transmission from the communication section 36 to the communication unit 16 is performed at a predetermined time interval. Since game processing is generally performed at a cycle of 1/60 sec. (at a cycle of one frame), the wireless transmission is preferably performed at a cycle of a time period equal to or shorter than 1/60 sec. At the transmission timing to the communication unit 16, the microcomputer 42 outputs the data stored on the memory 43 to the wireless module 44 as operation data. The wireless module 44 uses, for example, the Bluetooth (registered trademark) technology to modulate a carrier wave of a predetermined frequency with the operation data and radiate the resultant very weak electric signal from the antenna 45. Namely, the operation data is modulated into a very weak electric signal by the wireless module 44 and transmitted from the controller 5. The very weak electric signal is received by the communication unit 16 on the side of the game apparatus 3. The received very weak electric signal is demodulated or decoded, so that the game apparatus 3 can obtain the operation data. The CPU 10 of the game apparatus 3 executes the game processing based on the obtained operation data and the game program.

The game apparatus 3 transmits sound data to the controller 5 at an appropriate timing in accordance with the situation in the game. The sound data transmitted from the game apparatus 3 is received by the antenna 45. The microcomputer 42 obtains the sound data received by the antenna 45 via the wireless module 44. The microcomputer 42 also performs predetermined processing on the obtained sound data and outputs an audio signal to the speaker 49 via an amplifier (not shown). Thus, the game apparatus 3 can output a sound such as a sound effect of the game or the like from the speaker 49 on the side of the controller 5.

The microcomputer 42 controls the LEDs 34a through 34d to be on or off. For example, the microcomputer 42 detects the remaining battery amount of the controller 5, and lights up a part of, or all of, the LEDs 34a through 34d based on the detection result. Accordingly, the player can visually check the remaining battery amount with the LEDs 34a through 34d. The microcomputer 42 may light up a part of, or all of, the LEDs 34a through 34d in accordance with an instruction from the game apparatus 3 (the above-described control data).

By using the controller 5, the player can perform a game operation of changing the posture of the controller 5, moving the position of the controller 5 or rotating the controller 5, in addition to a conventional general operation of pressing the operation buttons.

Figure 7:
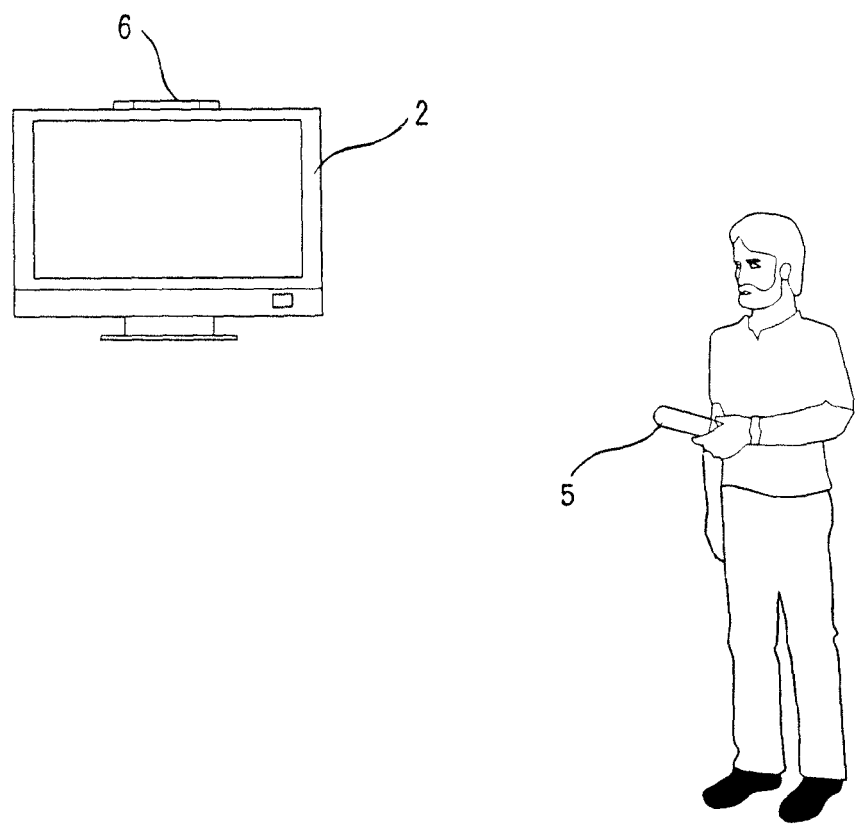
FIG. 7 shows how the controller 5 is used to perform a game operation.

FIG. 7 shows how the controller 5 is used to perform a game operation. When playing the game using the controller 5 with the game system 1, the player holds the controller 5 with one hand as shown in FIG. 7. In this embodiment, the player performs a game operation by designating any position on the display screen of the TV 2 with the controller 5 (designating a desired position on the display screen as the indicated position by the controller 5).

(Structure of the Sensor Bar)

Figure 8:
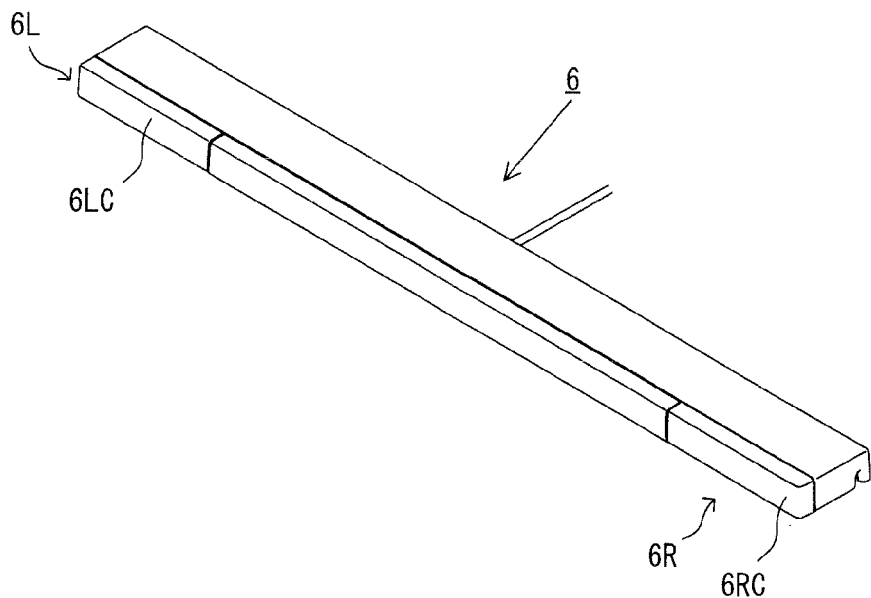
FIG. 8 is an external isometric view of a sensor bar 6 shown in FIG. 1.
Figure 9:
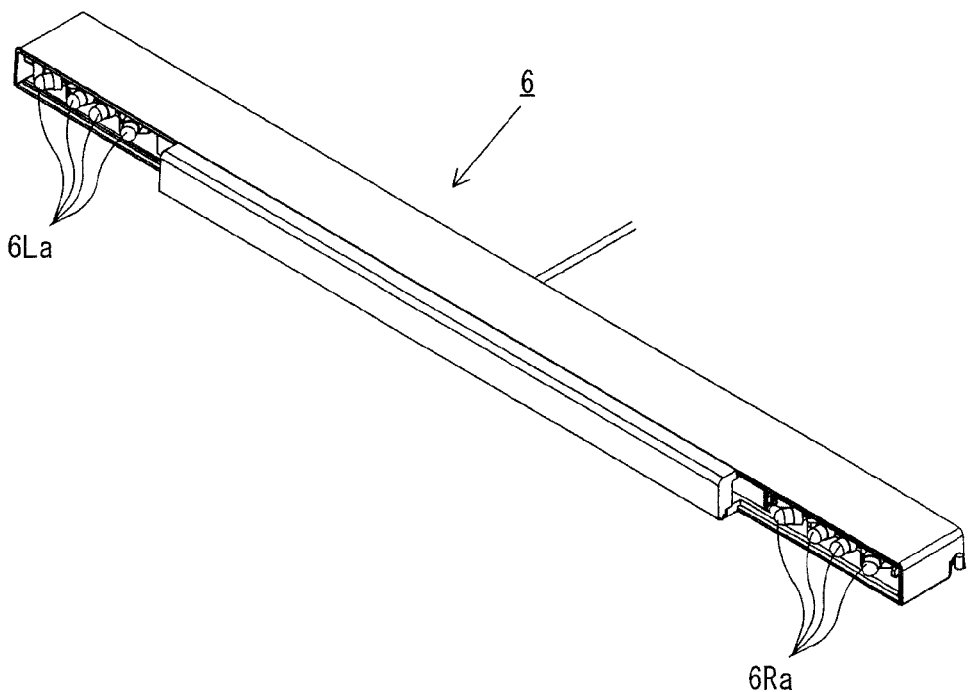
FIG. 9 is an isometric view of the sensor bar 6 in the state where covers 6RC and 6LC of markers 6R and 6L are removed.

With reference to FIG. 8 and FIG. 9, the sensor bar 6 will be described. FIG. 8 is an external isometric view of the sensor bar 6 shown in FIG. 1. As shown in FIG. 8, the sensor bar 6 has a rod-like external shape. The sensor bar 6 includes two markers, i.e., the marker 6R on one of two ends thereof and the marker 6L on the other end thereof. The marker 6R includes a cover 6RC and an infrared LED (an infrared LED 6Ra shown in FIG. 9). The marker 6L includes a cover 6LC and an infrared LED (an infrared LED 6La shown in FIG. 9).

FIG. 9 is an isometric view of the sensor bar 6 in the state where the cover 6RC of the marker 6R and the cover 6LC of the marker 6L are removed. As shown in FIG. 9, the marker 6R includes four infrared LED 6Ra, and the marker 6L includes four infrared LED 6La. The four infrared LED 6Ra are located close together, and so are imaged integrally by the imaging means of the controller 5. The four infrared LED 6Ra are located in one line laterally and are directed radially. Namely, the two outer infrared LEDs 6Ra are directed outward than the two inner infrared LEDs 6Ra. Owing to this arrangement, the radiation angle of the entirety of the four infrared LEDs 6Ra (the radiation angle of the marker 6R) is increased in the lateral direction. Therefore, where the sensor bar 6 is installed in the vicinity of the TV 2, the controller 5 can receive the infrared light from the marker 6R in a wide right-to-left range with respect to the direction perpendicular to the display screen of the TV 2. Namely, the player can use the controller 5 in the wide right-to-left range with respect to the direction perpendicular to the display screen of the TV 2. The four infrared LEDs 6La are located in the same manner as the infrared LEDs 6Ra. In another embodiment, each marker may include any number of infrared LEDs. In the case where each marker includes a plurality of infrared LEDs, the infrared LEDs are preferably located in one line laterally such that the LEDs are directed radially. Each marker may include one infrared LED and a cover for randomly reflecting the infrared light from the infrared LED.

(Structure of the Control Target Device)

Figure 10:
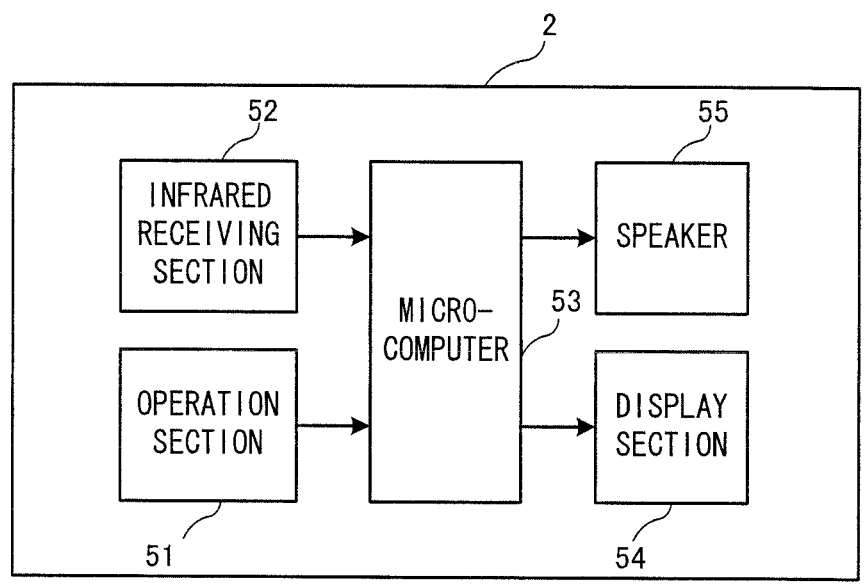
FIG. 10 is a functional block diagram of a control target device.

Next, with reference to FIG. 10, the TV 2 as an example of the control target device will be described. FIG. 10 is a functional block diagram of the TV 2. As shown in FIG. 10, the TV 2 includes an operation section 51, an infrared receiving section 52, a microcomputer 53, a display section 54, and a speaker 55. The operation section 51 is input means for operating a power on/off switch, a channel switch, a volume switch and other functional elements of the TV 2. An operation signal which represents an operation made on each switch of the operation section 51 is output to the microcomputer 53. The infrared receiving section 52 receives an infrared signal (remote control signal) from a remote control of the TV 2 or the sensor bar 6. The received infrared signal is converted into an electric signal and output to the microcomputer 53. The microcomputer 53 controls the display section 54, the speaker 55 and other elements not shown including a tuner, in accordance with the signal from the operation signal from the operation section 51 or a signal from the infrared receiving section 52. For example, when receiving a signal to switch the power on/off, the microcomputer 53 stops power supply to the corresponding element. When receiving a signal to change the sound volume, the microcomputer 53 changes the volume of the sound which is output from the speaker 55. FIG. 10 shows the TV 2 as an example of the control target device, but the control target device may be any device which includes an infrared receiving section and the motion of which is controllable by an infrared signal.

(Processing by the Game Apparatus)

Next, processing executed by the game apparatus 3 will be described. In this embodiment, a race game is executed by the game apparatus 3. In this embodiment, the TV 2 and a remote control car 71 (described later with reference to FIG. 23) are controlled as the control target devices by the game apparatus 3.

Figure 11:
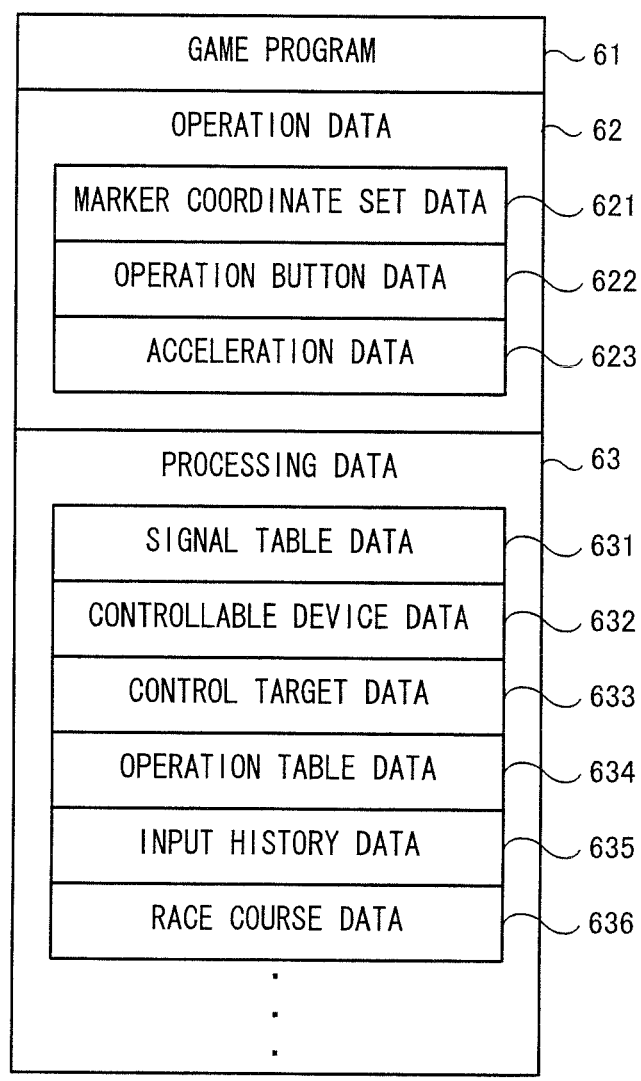
FIG. 11 shows main data stored on storage means of the game apparatus 3.

First, main data used by the game apparatus 3 for the game processing will be described with reference to FIG. 11. FIG. 11 shows main data stored on storage means (the main memory 13, the flash memory 18, and the like) of the game apparatus 3. As shown in FIG. 11, the storage means of the game apparatus 3 has stored thereon a game program 61, operation data 62, processing data 63 and the like. The main memory 13 includes image data on characters appearing in the game, sound data on sound effects and BGM, and other data necessary for the game processing in addition to the data shown in FIG. 11.

The game program 61 is partially or entirely read from the optical disc 4 and stored on the main memory 13 at an appropriate timing after the optical disc 4 is inserted into the game apparatus 3. The game program 61 includes programs necessary for executing the game processing described later.

The operation data 62 is transmitted from the controller 5 to the game apparatus 3, and is stored on the main memory 13. The operation data 62 includes marker coordinate set data 621, operation button data 622, and acceleration data 623. The marker coordinate set data 621 represents the positions of the imaging targets (the markers 6R and 6L) in the taken image, i.e., the marker coordinate sets mentioned above. The operation button data 622 represents operation particulars performed on each of the buttons 32a through 32i of the operation section 32 (whether or not each of the buttons 32a through 32*i* has been pressed). The acceleration data 623 represents an output from the acceleration sensor 37. In this embodiment, the acceleration data 623 is not used for the game processing, and so the controller 5 may have a structure without the acceleration sensor 37.

Figure 16:
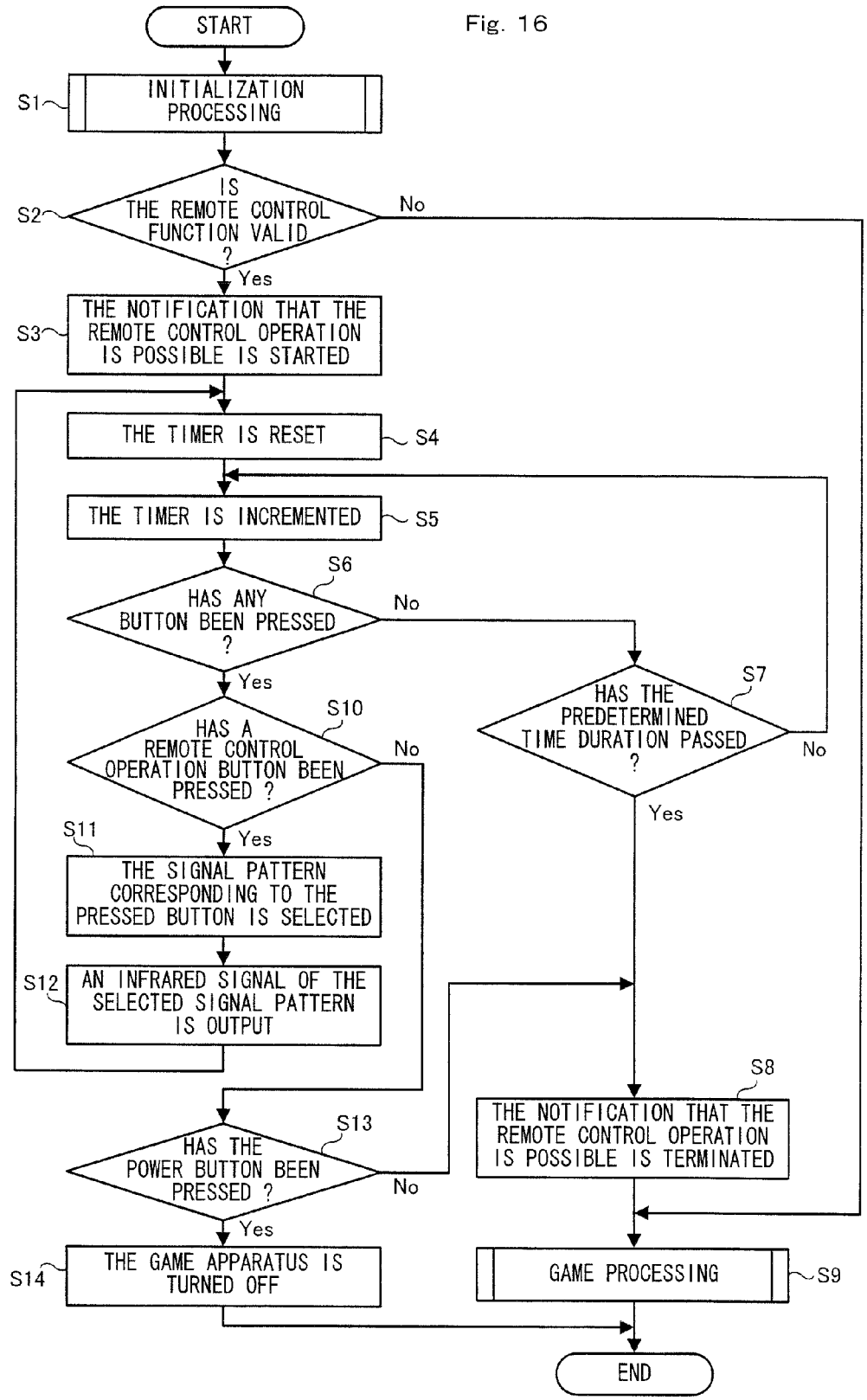
FIG. 16 is a main flowchart illustrating a flow of processing executed by the game apparatus 3.

The processing data 63 is used for the processing executed by the game apparatus 3 (see FIG. 16 and the like). The processing data 63 includes signal table data 631, controllable device data 632, control target data 633, operation table data 634, input history data 635 and race course data 636.

Figure 12:
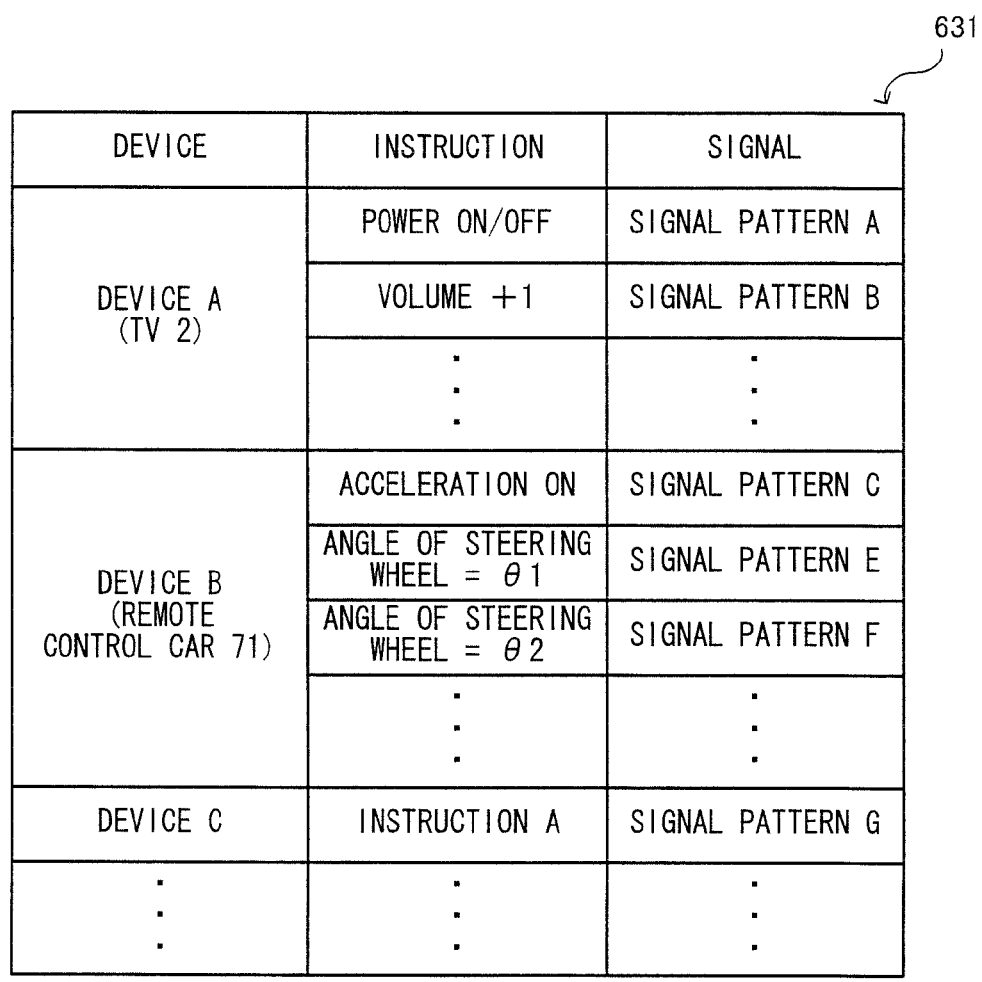
FIG. 12 shows an example of signal table data 631.

The signal table data 631 represents correspondence information between an instruction on the control target device and a signal pattern of the infrared signal to be transmitted in order to cause the control target device to follow the instruction. FIG. 12 shows an example of the signal table data 631. As shown in FIG. 12, the signal table data 631 includes the correspondence information between the instruction and the signal pattern for each device. The signal table data 631 includes different correspondence information for different types (e.g., manufacturer or model number) of the same device (e.g., TV). In this embodiment, the TV 2 and the remote control car 71 are the control target devices. Thus, the signal table data 631 includes correspondence information regarding the TV 2 and the remote control car 71.

In FIG. 12, device A is the TV 2, which is one of the control target devices. For device A, an instruction for switching power on/off and signal pattern A are associated with each other. In addition, an instruction for increasing the sound volume by one stage and signal pattern B are associated with each other.

In FIG. 12, device B is the remote control car 71, which is one of the control target devices. Herein, the game apparatus 3 can control an acceleration amount and the angle of the steering wheel of the remote control car 71. Specifically, as shown in FIG. 12, for device B, an instruction for turning on the accelerator and signal pattern C are associated with each other. In addition, an instruction for setting the angle of the steering wheel to θ1 and signal pattern E are associated with each other, and an instruction for setting the angle of the steering wheel to θ2 and signal pattern F are associated with each other. The angle of the steering wheel of the device B (remote control car 71) is controllable at, for example, 9 stages of θ1 through θ9, and a signal pattern is associated with each angle of the steering wheel.

The signal table data 631 is prepared in advance and is stored on, for example, the flash memory 18. The game apparatus 3 may update the contents of the signal table data 631 by obtaining correspondence information on a new device from a network or the like. In this case, even when a new control target device is added as a control target device, the correspondence information on such a device can be easily obtained.

Figure 13:
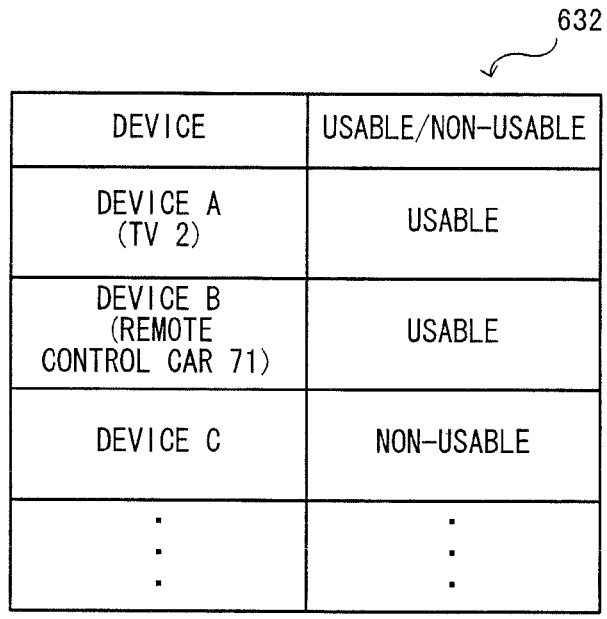
FIG. 13 shows an example of controllable device data 632.

FIG. 13 shows an example of the controllable device data 632. The controllable device data 632 represents information on whether each of the devices described in the signal table data 631 is usable or not as a control target device (usability information). The usability information is set (registered) by the player in advance. More specifically, the usability information is initially set to "non-usable". The term "non-usable" means that the device is not usable as a control target device. The player selects devices to be used as control target devices from a plurality of devices described in the controllable device data 632. The game apparatus 3 sets the usability information of the selected devices to "usable". During the processing shown in FIG. 16, the game apparatus 3 selects a control target device from the devices which are set to "usable". In this embodiment, as shown in FIG. 13, device A and device B are set to "usable", and the other devices (for example, device C) are set to "non-usable". The game apparatus 3 may set the usability information of only one type of a certain device (e.g., TV) to "usable" and set the other types of the same device to "non-usable".

The control target data 633 represents a device which is currently set as the control target device. Specifically, the control target data 633 represents one of the devices which are set to "usable" in the controllable device data 632. When none of the devices are "usable", the control target data 633 indicates that there is no control target device. In this embodiment, the control target device may be set or changed automatically by the game apparatus 3 at a predetermined timing. In another embodiment, the player may set or change the control target device.

Figure 14:
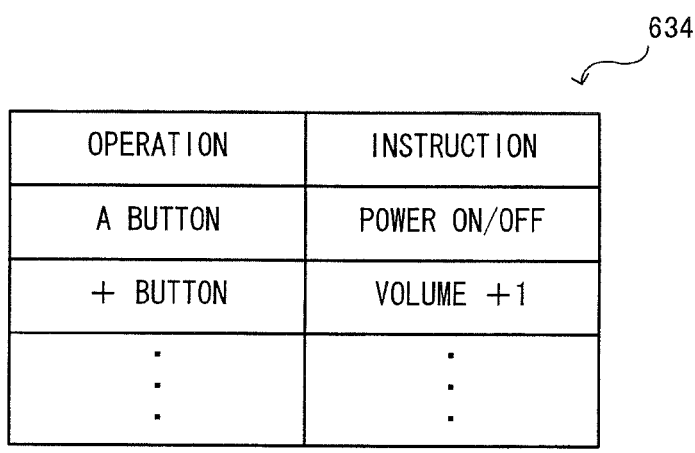
FIG. 14 shows an example of operation table data 634.
Figure 15:
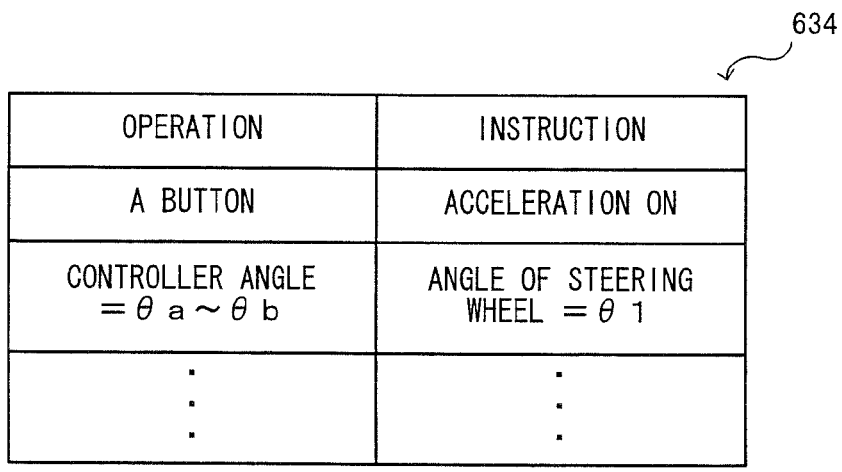
FIG. 15 shows another example of the operation table data 634.

The operation table data 634 represents correspondence between an operation using the controller 5 and an instruction to be followed by the control target device when such an operation is performed. FIG. 14 and FIG. 15 show examples of the operation table data 634. FIG. 14 shows the operation table data 634 when the control target device is, for example, device A (TV) shown in FIG. 12. In FIG. 14, an instruction for switching the power on/off is associated with an operation of pressing the A button 32*d* of the controller 5. In addition, an instruction for increasing the sound volume by one stage is associated with an operation of pressing the plus button 32*g* of the controller 5. When the control target device is changed during the processing by the game apparatus 3, the contents of the operation table data 634 are changed accordingly.

FIG. 15 shows the operation table data 634 when the control target device is, for example, device B (remote control car) shown in FIG. 12. In FIG. 15, an instruction for turning the accelerator on is associated with an operation of pressing the A button 32*d* of the controller 5. In addition, an instruction for setting the angle of the steering wheel to θ1 is associated with an operation of limiting the inclination angle of the controller 5 when the controller 5 is rotated around an axis in the longitudinal direction thereof to a range of θa to θb. Herein, the inclination angle of the controller 5 (0° through) 360° and the angle of the steering wheel are associated with each other such that the angle of the steering wheel is uniquely determined in accordance with the inclination angle of the controller 5. The inclination angle of the controller 5 when the controller 5 is rotated around an axis in the longitudinal direction thereof can be calculated based on the angle of the line segment connecting the marker coordinate sets of the two markers 6R and 6L. The inclination angle of the controller 5 is represented with respect to a predetermined reference angle of 0°.

As shown in FIG. 14 and FIG. 15, the contents of the operation table data 634 are different depending on the control target device. When the control target device is changed during the processing by the game apparatus 3, the contents of the operation table data 634 are changed accordingly.

The input history data 635 shows the history of inputs to the controller 5 used for operating the characters appearing in the game space or the control target device. The input history data 635 may be anything which specifies the inputs performed on the controller 5. For example, the input history data 635 may be a part or the entirety of the operation data 62 transmitted from the controller 5. When representing inputs used for operating the control target device, the input history data 635 may represent an instruction given to the control target device. When representing inputs used for operating a character, the input history data 635 may represent a motion of the character (for example, the position, speed, etc. of the character).

The race course data 636 represents a race course constructed in a virtual game space. Before the race game is started, the game apparatus 3 constructs a race course in the virtual game space in accordance with the race course data 636. A racing car operated by the player runs on the constructed race course.

Next, the processing executed by the game apparatus 3 will be described with reference to FIG. 16 through FIG. 25 in detail. FIG. 16 is a main flowchart illustrating a flow of the processing executed by the game apparatus 3. In this embodiment, the game apparatus 3 is in a stand-by state before being turned on. In this stand-by state, the game apparatus 3 stops executing the game program stored on the optical disc 4, and is capable of executing processing of, for example, obtaining various data from the network. The game apparatus 3 is capable of receiving data from the controller 5 even in the stand-by state. In the case where the game apparatus 3 and the controller 5 communicate each other wirelessly using the Bluetooth (registered trademark) technology, it is necessary to execute so-called paring processing in order to allow the game apparatus 3 and the controller 5 to recognize each other. In this embodiment, it is assumed that the paring processing is already executed and the wireless communication is possible between the game apparatus 3 and the controller 5.

When the power button 32h of the controller 5 is pressed while the game apparatus 3 is in the stand-by state, the game apparatus 3 is turned on. Namely, the game apparatus 3, upon receiving operation data 62 which represents that the power button 32h has been pressed from the controller 5, terminates the stand-by state and is turned on. When the game apparatus 3 is turned on, the CPU 10 of the game apparatus 3 executes the start program stored on the boot ROM (not shown) to initialize the elements including the main memory 13. The processing shown in FIG. 16 is executed after such processing is completed. In this embodiment, the programs for executing processing other than the game processing (step S9) among the processing shown in FIG. 16 are stored in the game apparatus 3 in advance. In another embodiment, such programs may be stored on the optical disc 4.

In this embodiment, before the processing shown in FIG. 16 is executed, a device having a TV function is set as the control target device in the control target data 633 among the devices usable as the control target devices. The devices usable as the control target devices are represented by the controllable device data 632. In this embodiment, the devices to be used as the control target devices are the TV 2 and the remote control car 71. Data representing the TV 2 is stored on the main memory 13 as the control target data 633. The contents of the operation table data 634 are updated such that a function for operating the TV 2 is assigned to at least one of the operation buttons 32a through 32i of the controller 5. When there is no device having a TV function among the devices usable as the control target devices, data indicating that there is no control target device is stored on the main memory 13 as the control target data 633.

With reference to FIG. 16, initialization processing is executed in step S1. The initialization processing is executed for identifying the controller 5 used in the subsequent processing. Hereinafter, with reference to FIG. 17, the initialization processing will be described.

Figure 17:
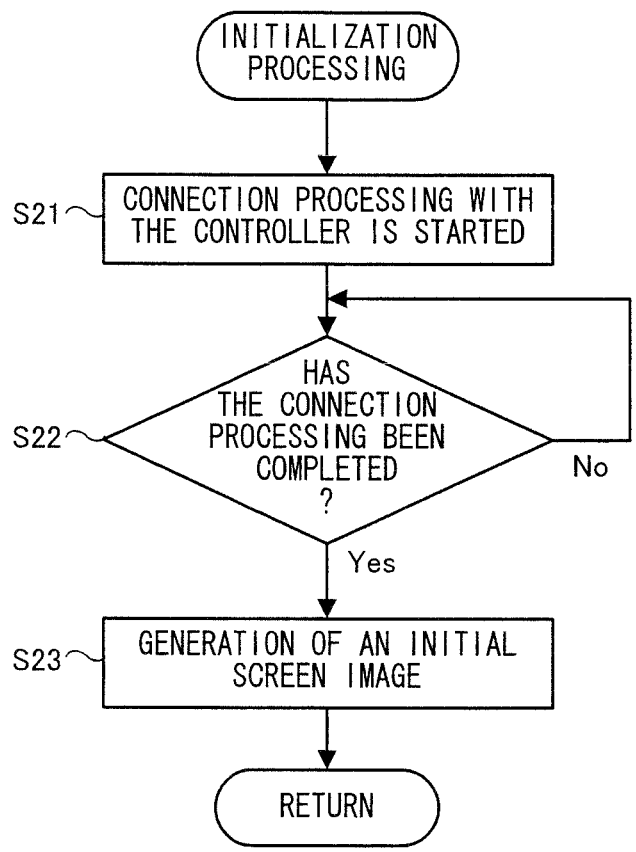
FIG. 17 is a flowchart illustrating initialization processing (step S1) shown in FIG. 16 in detail.

FIG. 17 is a flowchart illustrating the initialization processing (step 1) shown in FIG. 16 in detail. The initialization processing is executed as follows. In step S21, the CPU 10 starts connection processing with the controller 5. By the connection processing, the game apparatus 3 assigns a number to the controller 5 for identifying the controller 5. The CPU 10 detects the controllers 5 which are currently wirelessly communicable with the game apparatus 3, and assigns an inherent number to each of the detected controllers 5 (for example, sequentially assigns integer numbers from "1"). In this embodiment, the maximum number of controllers 5 which are wirelessly communicable at once is four.

Next in step S22, the CPU 10 determines whether or not the connection processing has been completed. When the determination result in step S22 is positive, processing in step S23 is executed. By contrast, when the determination result in step S22 is negative, processing in step S22 is repeated. Namely, the CPU 10 waits until the connection processing is completed, and executes the processing in step S23 after the connection processing is completed.

In this embodiment, while the connection processing is being executed, each of the controllers 5 notifies the remaining battery amount thereof to the player. Specifically, the microcomputer 42 of each controller 5 detects the remaining battery amount and outputs information representing the detection result using the LEDs 34a through 34d. In more detail, the number of LEDs to be lit up is changed in accordance with the detected remaining battery amount. For example, as the remaining battery amount is larger, a greater number of LEDs are lit up. Owing to this operation, the player can confirm the remaining battery amount of his/her controller 5 while waiting for the controller 5 to be connected to the game apparatus 3. In the connection processing, upon receiving the number assigned to each controller 5, the microcomputer 42 of the controller 5 stops lighting up the LEDs 34a through 34d to represent the remaining battery amount. Then, the microcomputer 42 outputs information representing the assigned number using the LEDs 34a through 34d. Specifically, the microcomputer 42 lights up only the LED corresponding to the assigned number among the LEDs 34a through 34d. In the case where a plurality of controllers 5 are assigned a number by the game apparatus 3, each controller 5 is given a different number. Thus, the plurality of controllers 5 have different LEDs lit up from one another. Owing to this, the player can easily identify his/her controller from the controllers 5 of the other players.

In step S23, the CPU 10 generates image data for an initial screen image. The image data for the initial screen image may be stored in advance on the storage means such as the flash memory 18 or the like. The initial screen image is a menu screen image for, for example, displaying executable game programs or controllable control target devices, or for allowing the player to perform various settings regarding the game apparatus 3. When the TV 2 is on at the time of step S23, the initial screen image is displayed on the TV 2. When the TV 2 is off at the time of step S23, the initial screen image is not displayed on the TV 2. In this case, the initial screen image is displayed on the TV 2 after the TV is turned on. After step S23, the CPU 10 terminate the initialization processing.

Returning to FIG. 16, in step S2, the CPU 10 determines whether or not a remote control function of the game system 1 is valid. Herein, the expression that "the remote control function is valid" means that there is at least one controllable control target device. When the control target data 633 stored on the main memory 13 represents a device, it is determined that the remote control function is valid. By contrast, when the control target data 633 stored on the main memory 13 does not represent any device (i.e., when the control target data 633 indicates that there is no control target device), it is determined that the remote control function is invalid. When the determination result in step S2 is positive, processing in step S3 is executed. By contrast, when the determination result in step S2 is negative, processing in step S9 is executed.

In step S3, the CPU 10 notifies the player that the remote control operation is possible, i.e., that the control target device is operable. In this embodiment, the notification in step S3 is performed using the LEDs 34a through 34d of the controller 5. Specifically, the CPU 10 transmits control data for lighting up the LEDs 34a through 34d in a predetermined pattern to the controller 5. Upon receiving the control data, the microcomputer 42 of the controller 5 lights up the LEDs 34a through 34d in the pattern in accordance with the control data. In this embodiment, the operation of lighting up the LEDs 34a through 34d in the predetermined pattern is started in step S3 and is continued until the remote control operation becomes impossible (step S8). In another embodiment, the operation of lighting up the LEDs 34a through 34d in the predetermined pattern is started in step S3 and may be terminated after a predetermined time duration.

Figure 18A:
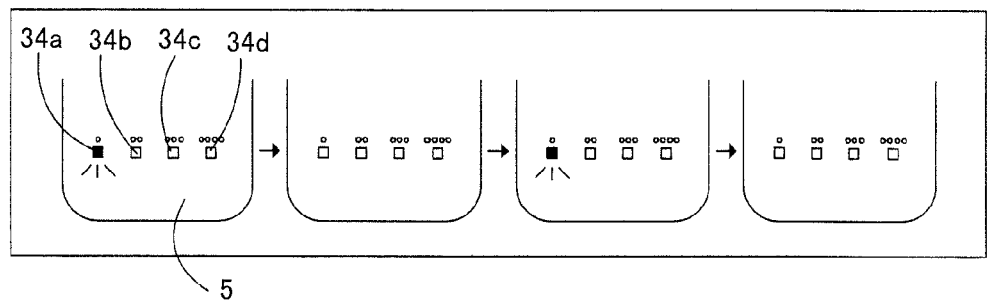
FIG. 18A shows an exemplary pattern of lighting up LEDs 34a through 34d.
Figure 18B:
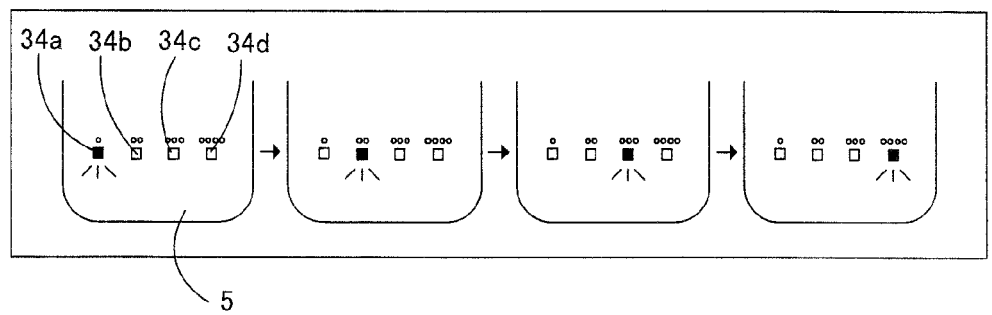
FIG. 18B shows another exemplary pattern of lighting up the LEDs 34a through 34d.
Figure 18C:
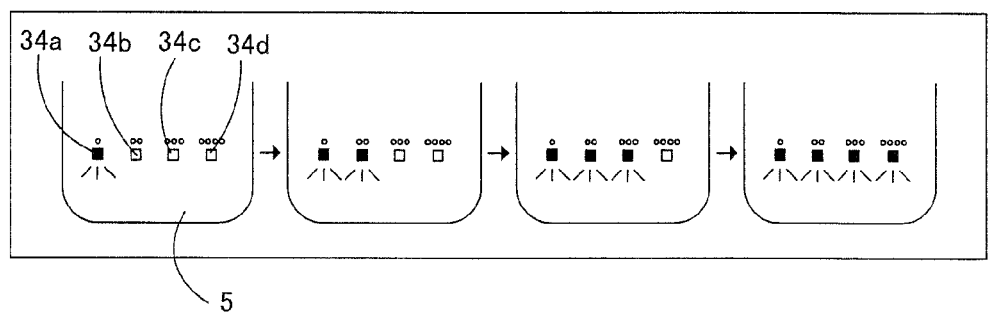
FIG. 18C shows still another exemplary pattern of lighting up the LEDs 34a through 34d.

FIG. 18A, FIG. 18B and FIG. 18C show exemplary patterns of lighting up the LEDs 34a through 34d. As shown in FIG. 18A, at least one of the LEDs 34a through 34d (in FIG. 18A, the LED 34a) may be blinked at a predetermined interval. As shown in FIG. 18B, the LEDs 34a through 34d may be sequentially lit up at a predetermined interval. As shown in FIG. 18C, the number of LEDs among the LEDs 34a through 34d to be lit up may be increased one by one, and after all the LEDs 34a through 34d are lit up, one of the LEDs may be lit up again. The pattern of lighting up the LEDs in order to notify that the remote control operation is possible may be any pattern as long as the pattern is different from the pattern used when the remote control operation is impossible.

In another embodiment, the CPU 10 may notify that the remote control operation is possible in step S3 by outputting a predetermined sound from the speaker 49 of the controller 5 instead of lighting up the LEDs 34a through 34d.

By the processing in step S3, the processing mode is set to a device operation mode. In the device operation mode, the control target device is operable using the controller 5. After step S3, processing in step S4 is executed.

In step S4, the CPU 10 resets the value of a timer which is used to determine whether or not to terminate the device operation mode. Namely, the CPU 10 sets the value of the timer to "0". Next in step S5, the value of the timer is incremented. In this embodiment, the processing in step S5 is executed every frame (e.g., at an interval of 1/60 sec.), and the value of the timer is incremented by one frame each time the processing in step S5 is executed.

Next in step S6, the CPU 10 determines whether or not any of the operation buttons 32a through 32i of the controller 5 has been pressed. Specifically, the CPU 10 obtains the operation data 62 from the controller 5 and stores the obtained operation data 62 on the main memory 13. The operation data 62 includes the operation button data 622. The CPU 10 refers to the operation button data 622 to determine whether or not any of the operation buttons 32a through 32i of the controller 5 has been pressed. When the determination result in step S6 is positive, processing in step S10 is executed as described later. By contrast, when the determination result in step S6 is negative, processing in step S7 is executed.

In step S7, the CPU 10 determines whether or not a predetermined time duration has passed since the last time when any of the operation buttons 32a through 32i of the controller 5 was pressed. Herein, the value of the timer represents the time duration since the last time when any of the operation buttons 32a through 32i of the controller 5 was pressed (in the case where no button has been pressed, the time duration since the processing in step S4 was first executed). Thus, the determination in step S7 can be made by referring to the value of the timer. When the value of the timer is larger than the predetermined time duration, the determination result in step S7 is positive; whereas when the value of the timer is smaller than the predetermined time duration, the determination result in step S7 is negative. When the determination result in step S7 is positive, processing in step S8 is executed. By contrast, when the determination result in step S7 is negative, the processing returns to step S5. Namely, the CPU 10 repeats the processing in steps S5 through S7 from the time when the timer is reset in step S4 until any of the operation buttons 32a through 32i is pressed or until the predetermined time duration passes.

In step S8, the CPU 10 terminates the notification started in step S3. Specifically, the CPU 10 transmits control data for stopping lighting up the LEDs 34a through 34d in the predetermined pattern to the controller 5. Upon receiving the control data, the microcomputer 42 of the controller 5 stops lighting up the LEDs 34a through 34d in the predetermined pattern. Then, the microcomputer 42 lights up the LEDs 34a through 34d so as to show that the game apparatus 3 is not in the device operation mode. Specifically, the microcomputer 42 lights up only the LED corresponding to the assigned number among the LEDs 34a through 34d. After step S8, processing in step S9 is executed.

In step S9, the CPU 10 executes the game program 61 stored on the optical disc 4 to execute the game processing. In the game processing, for example, the CPU 10 causes the TV 2 to display a virtual game space, and causes a character appearing in the virtual game space to perform a motion in accordance with the operation data from the controller 5. Specific examples of the game processing will be described later. After step S9, the CPU terminates the processing shown in FIG. 16.

In step S10, the CPU 10 determines whether or not a remote control operation button among the operation buttons 32a through 32i of the controller 5 has been pressed, based on the operation data obtained in step S6. Namely, the CPU 10 determines whether or not the operation data represents an operation of pressing a remote control operation button. The "remote control operation button" is an operation button assigned a function for performing a remote control operation (operation of the control target device). The remote control operation button can be specified by referring to the operation table data 634 stored on the main memory 13. For example, in the case of the operation table data 634 shown in FIG. 15, the A button 32d and the plus button 32g are remote control operation buttons. When the determination result in step S10 is positive, processing in step S11 is executed. By contrast, when the determination result in step S10 is negative, processing in step S13 is executed.

In step S11 and S12, an infrared signal for operating the control target device (TV 2) is output. First in step S11, the CPU 10 selects a signal pattern corresponding to the pressed remote control operation button. The signal pattern is selected by referring to the operation table data 634. Namely, the CPU 10 first specifies an instruction associated with the operation represented by the operation data 62 obtained in step S6 in the operation table data 634. Next, the CPU 10 refers to the signal table data 631 to select the signal pattern corresponding to the specified instruction. When the signal table data 631 is referred to, the correspondence information regarding the device represented by the control device data 633 is referred to.

Next in step S12, the CPU 10 causes the infrared LEDs 6Ra and 6La included in the sensor bar 6 to output an infrared signal of the signal pattern selected in step S11. In this way, a remote control signal for controlling the control target device (TV 2 in this example) is output. In general, a PPM (Pulse Position Modulation) signal is output as the remote control signal. After step S12, the processing returns to step S4.

In step S13, the CPU 10 determines whether or not the power button 32h has been pressed, based on the operation data 62 obtained in step S6. When the determination result in step S13 is positive, processing in step S14 is executed. By contrast, when the determination result in step S13 is negative, the processing in step S8 is executed. When the determination result in step S13 is negative, an operation which is neither a remote control operation button nor the power button 32h is pressed. Namely, in this embodiment, when an operation button which is neither a remote control operation button nor the power button 32h is pressed, the device operation mode is terminated (step S8) and the game processing is executed (step S9).

In step S14, the CPU 10 turns off the game apparatus 3 (places the game apparatus 3 into the stand-by state), and terminates the processing in FIG. 16. The controller 5 having the power button 32h pressed is turned off. In the case where a plurality of controllers 5 are communicable with the game apparatus 3, the CPU 10 may instruct to turn off the controllers 5 other than the controller 5 having the power button 32h pressed.

As described above, in this embodiment, when the game apparatus 3 is turned on, the processing mode is set to the device operation mode (step S3). Under the condition that no input is made on any of the operation buttons of the controller 5 for a predetermine time duration (YES in step S7) or an operation button other than the remote control operation buttons (NO in step S10), the processing mode is switched to a game processing mode (step S9). In the game processing mode, the game processing is executed based on the operation made on the controller 5.

Figure 19:
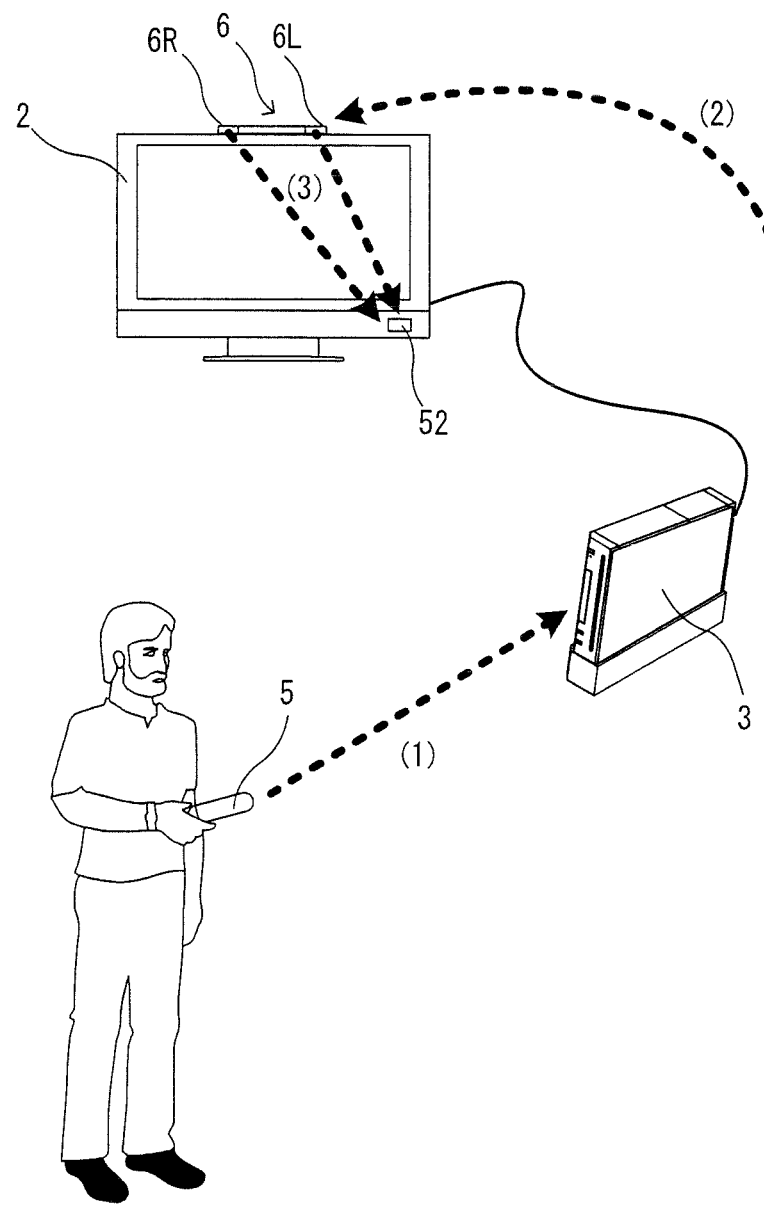
FIG. 19 shows how a TV 2 is controlled by the game apparatus 3 executing the processing shown in FIG. 16.

FIG. 19 shows how the TV 2 is controlled by the processing shown in FIG. 16 executed by the game apparatus 3. In this embodiment, when the game apparatus 3 is turned on, the game apparatus 3 is placed into the device operation mode, in which the TV 2 as the control target device is operable. When the player presses a button for turning on the TV 2 (the A button 32d of the controller 5) in this state, the operation data 62 indicating that such a button has been pressed is transmitted from the controller 5 to the game apparatus 3 (arrow (1) in FIG. 19). In this way, the determination result in step S10 (FIG. 16) is made positive. Thus, the game apparatus 3 instructs the sensor bar 6 to output an infrared signal for turning on the TV 2 in step S11 (arrow (2) in FIG. 19). In accordance with the instruction, the markers 6R and 6L of the sensor bar 6 radiate the infrared signal (arrows (3) in FIG. 19). The radiated infrared signal is received by the infrared receiving section 52 of the TV 2. The infrared light from the markers 6R and 6L is either directly received by the infrared receiving section 52, or is reflected by an object in the vicinity of the TV 2 (an object in the room, the wall or glass window of the room, etc.). In the latter case, the reflected light is received by the infrared receiving section 52. By the infrared receiving section 52 receiving the infrared signal, the TV 2 is turned on. As described above, in this embodiment, the player can operate the TV 2 using the controller 5 before starting the game. Even if the TV 2 is off before starting the game, the player does not need to look for the remote control of the TV 2 and can start the game only by operating the controller 5.

Figure 20:
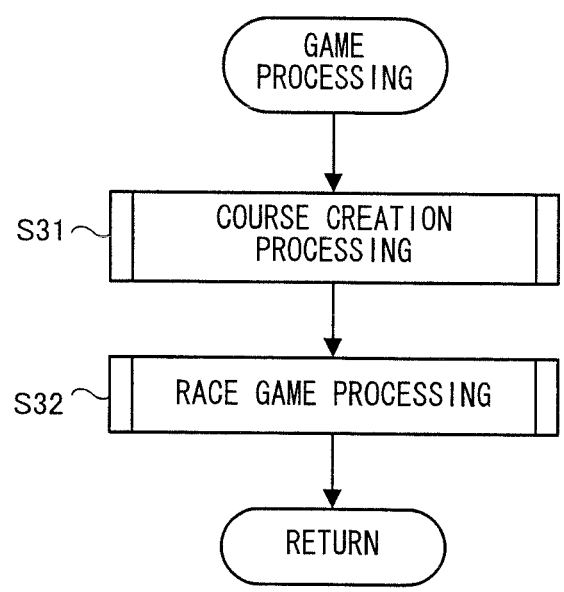
FIG. 20 is a flowchart illustrating game processing (step S9) shown in FIG. 16 in detail.

Next, the game processing in step S9 will be described in detail. FIG. 20 is a flowchart illustrating the game processing (step S9) in FIG. 16 in detail. As described above, the game processing shown in FIG. 20 is for a race game. During the game processing mode, the control target device is the remote control car 71, not the TV 2. Specifically, when starting the game processing, the CPU 10 changes the contents of the control target data 633 and the operation table data 634 stored on the main memory 13. More specifically, the CPU 10 stores data representing the remote control car 71 on the main memory 13 as the control target data 633 in place of the data representing the TV 2. The CPU 10 also changes the contents of the operation table data 634 into contents for operating the remote control car 71.

In the game processing mode, the CPU 10 continuously causes the markers 6R and 6L to output the infrared light except for when an infrared signal is output (in the game processing shown in FIG. 20, steps S45 (FIG. 21) and S58 (FIG. 24)).

The game processing shown in FIG. 20 is executed as follows. First in step S31, the CPU 10 executes course creation processing. By the course creation processing, a race course in the virtual game space is created based on an instruction made to the remote control car 71 as the control target device. Hereinafter, the course creation processing will be described with reference to FIG. 21 in detail.

Figure 21:
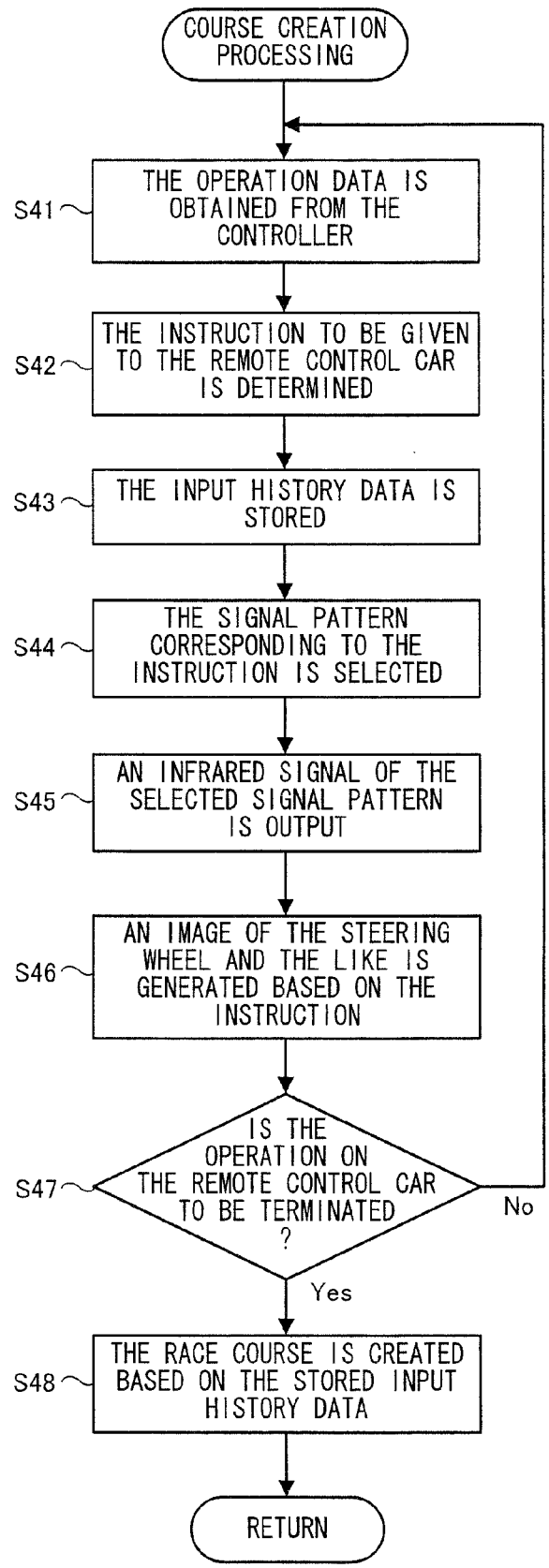
FIG. 21 is a flowchart illustrating course creation processing (step S31) shown in FIG. 20 in detail.

FIG. 21 is a flowchart illustrating the course creation processing (step S31) shown in FIG. 20 in detail. The course creation processing is executed as follows. First in step S41, the CPU 10 obtains operation data 62 from the controller 5. The controller 5 transmits the operation data 62 at a predetermined time interval (for example, at an interval of equal to or shorter than one frame). The CPU 10 stores the transmitted operation data 62 on the main memory 13. The operation data 62 includes the marker coordinate set data 621, the operation button data 622, and the acceleration data 623. The CPU 10 updates and stores the data 621 through 623 included in the operation data 62 on the main memory 13. In this embodiment, the processing loop of steps S41 through S47 is executed for each frame.

Next in step S42, the CPU 10 determines an instruction to be given to the remote control car 71 based on the operation made on the controller 5. The instruction to be given to the remote control car 71 is determined by referring to the operation table data 634. Namely, the CPU 10 determines the instruction, associated with the operation represented by the operation data 62 obtained in step S41 in the operation table data 634, as the instruction to be given to the remote control car 71.

This will be described with reference to the operation table data 634 shown in FIG. 15. The CPU 10 determines whether or not the A button 32d has been pressed based on the operation button data 622 included in the operation data 62. When the A button 32d has been pressed, the CPU 10 refers to the operation table data 634 to determine the instruction corresponding to the operation of pressing the A button 32d, i.e., the instruction to turning on the accelerator, as the instruction to be given to the remote control car 71. The CPU 10 also calculates the rotation angle of the controller 5 around an axis in the longitudinal direction thereof, based on the marker coordinate set data 621. The CPU 10 determines the angle of the steering wheel in accordance with the calculated rotation angle, referring to the rotation table data 634. As described above, the operation on the controller 5 for controlling the remote control car 71 is not limited to pressing the operation buttons 32a through 32i of the controller 5, and may be rotating the controller 5 around an axis in the longitudinal direction thereof. Alternatively, the operation may be changing the indicated position by the controller 5. In this embodiment, the acceleration data 623 included in the operation data 62 in not used for the game processing. In another embodiment, the game processing may be executed based on the acceleration data 623.

In step S43, the CPU 10 stores the input history data 635. In this embodiment, data representing the instruction determined in step S42 is stored on the main memory 13 as the input history data 635. Namely, data indicating whether the accelerator of the remote control car 71 is to be on or off, and data representing the angle (rotation amount) of the steering wheel to be given to the remote control car 71, are stored on the main memory 13. In this embodiment, while the processing loop of steps S41 through S47 is being executed, the input history data 635 is additionally stored each time step S43 is performed. On the main memory 13, data representing all the instructions determined in step S42 while the processing loop is being executed is stored in the order of being created. In this way, the history of inputs which were made during the processing loop of steps S41 through S46 is stored.

Next in step S44, the CPU 10 selects the signal pattern of the infrared signal corresponding to the instruction determined in step S42. The signal pattern is selected by referring to the signal table data 631 stored on the main memory 13. The CPU 10 selects the signal pattern associated with the instruction determined in step S42 in the correspondence information regarding the remote control car 71 in the signal table data 631. Next in step S45, the CPU 10 causes the infrared LEDs 6Ra and 6La included in the sensor bar 6 to output an infrared signal of the signal pattern selected in step S44.

Figure 22:
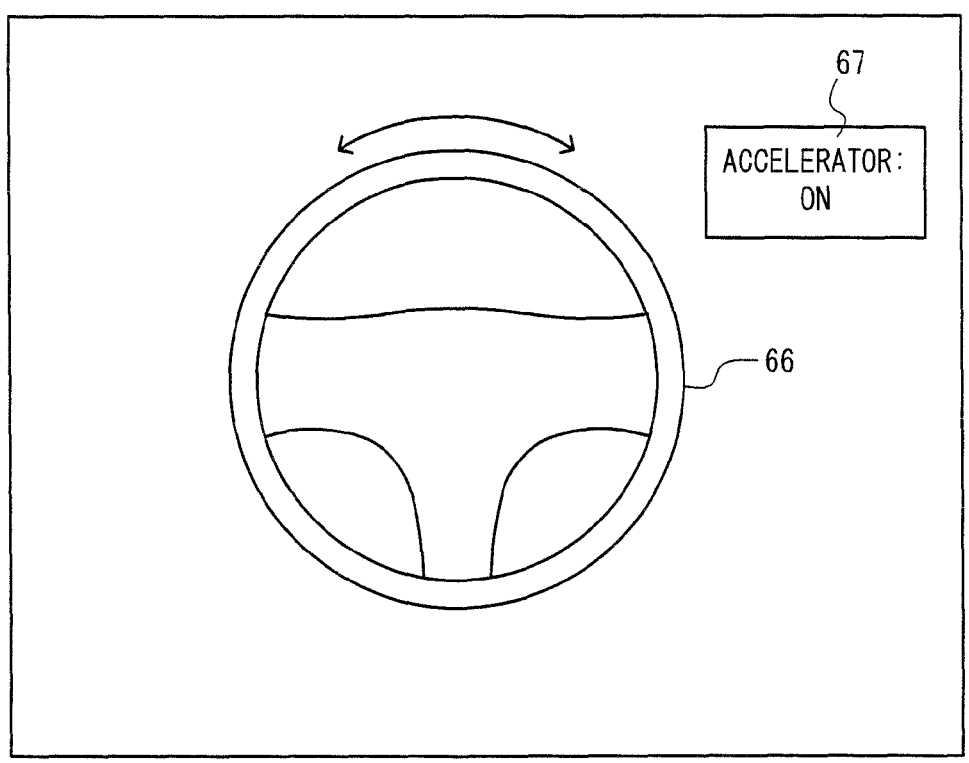
FIG. 22 shows an exemplary game image displayed on a screen in the course creation processing.

In step S46, the CPU 10 generates an image representing the instruction determined in step S42 and causes the TV 2 to display the generated image. FIG. 22 shows an exemplary game image displayed on the TV 2 in the course creation processing. As shown in FIG. 22, the display screen of the TV 2 displays a steering wheel image 66 and an image 67 representing whether the accelerator is on or off as the image representing the instruction. The steering wheel image 66 is displayed as rotating in accordance with the angle of the steering wheel. When the accelerator is set to "on", the image 67 is displayed as "ACCELERATOR: ON" as shown in FIG. 22. When the accelerator is set to "off", the image 67 is displayed as "ACCELERATOR: OFF". Since the image representing the instruction is displayed, the player can visually check the operation particulars on the remote control car 71. Thus, the player can easily operate the remote control car 71.

Next in step S47, the CPU 10 determines whether or not to terminate the operation on the control target device (remote control car 71). This determination is made based on, for example, whether or not a predetermined time duration has passed since the course creation processing was started, or whether or not the player performed a predetermined operation of terminating the operation. When the determination in step S47 is positive, the processing in step S48 is executed. By contrast, when the determination in step S47 is negative, the processing returns to step S41.

Figure 23:
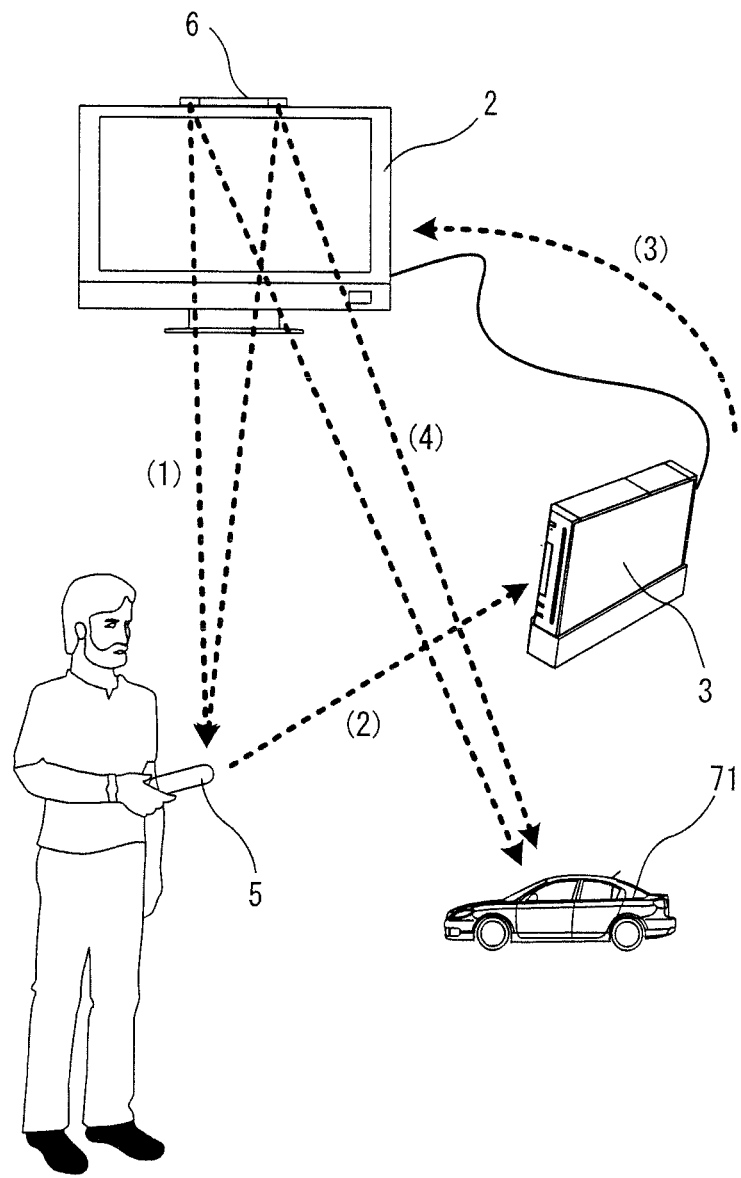
FIG. 23 shows how a remote control car 71 is operated using the controller 5.

FIG. 23 shows how the remote control car 71 is operated using the controller 5. The operation on the remote control car 71 using the controller 5 is performed by repeating the processing in steps S41 through S47. Specifically, the imaging information calculation section 35 of the controller 5 takes an image of the markers 6R and 6L (arrows (1) in FIG. 23), and the controller 5 transmits the imaging information (information on the marker coordinate sets) to the game apparatus 3 as the operation data 62 (arrow (2) in FIG. 23). The game apparatus 3 obtains the operation data 62 in step S41, and determines the instruction to be given to the remote control car 71 based on the operation data 62 in step S42. The game apparatus 3 instructs the sensor bar 6 to output an infrared signal in accordance with the determined instruction in steps S44 and S45 (arrow (3) in FIG. 23). Following this instruction from the game apparatus 3, the markers 6R and 6L of the sensor bar 6 radiate the infrared signal (arrows (4) in FIG. 23). The radiated infrared signal is received by an infrared receiving section of the remote control car 71. As a result, the motion of the remote control car 71 is controlled. In this way, the player can operate the remote control car 71 using the controller 5. In this embodiment, the instructions made while the remote control car 71 is being operated are stored in the game apparatus 3 by the processing in step S43.

Returning to FIG. 21, in step S48, the CPU 10 creates a race course to be constructed in the game space based on the input history data 635 stored on the main memory 13. The race course may be created, for example, as follows. The running track of the remote control car 71 is calculated based on the input history data 635. Then, the race course is created so as to follow the calculated track. Data representing the created race course is stored on the main memory 13 as the race course data 636. After step S48, the CPU 10 terminates the course creation processing.

Figure 24:
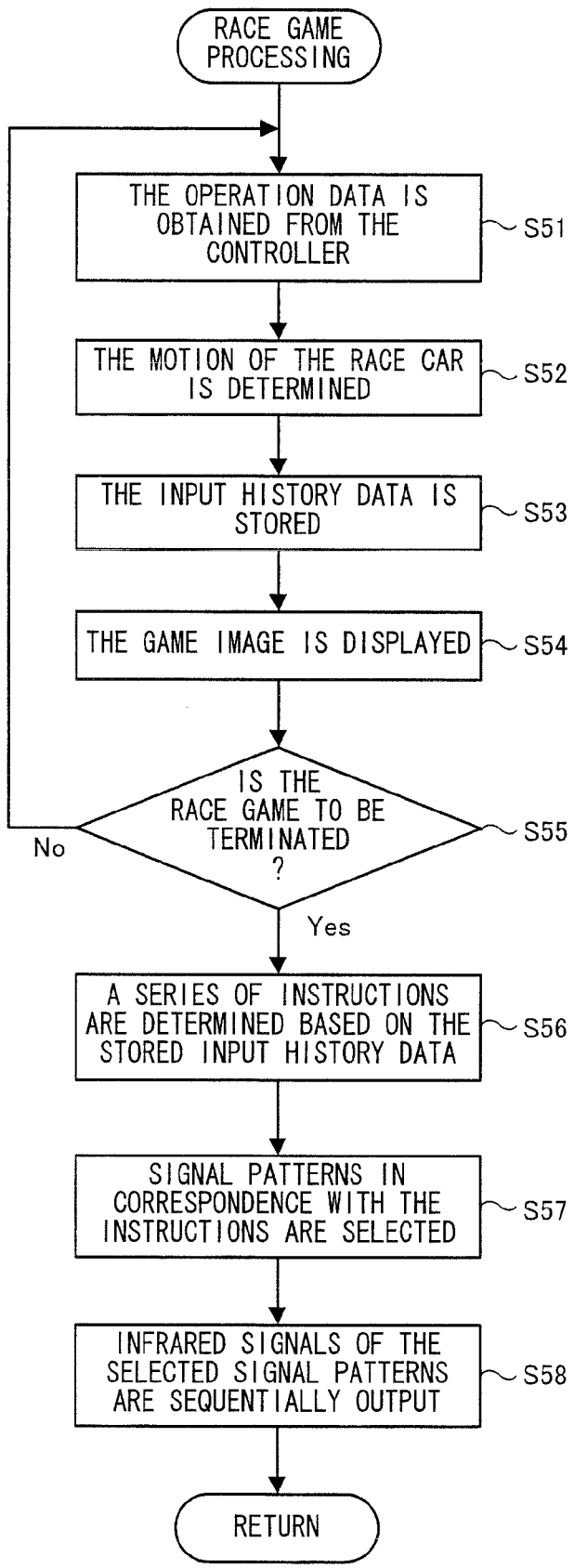
FIG. 24 is a flowchart illustrating race game processing (step S32) shown in FIG. 20 in detail.

Returning to FIG. 20, in step S32, the CPU 10 executes race game processing. By the race game processing, a character (racing car) is moved on the race course in the virtual game space in accordance with the operation made on the controller 5. With reference to FIG. 24, the race game processing will be described in detail.

FIG. 24 is a flowchart illustrating the race game processing (step S32) shown in FIG. 20 in detail. The race game processing is executed as follows. First, a race course is constructed in the game space in accordance with the race course data 636 stored on the main memory 13, and then a game image representing a part or the entirety of the game space and a character appearing in the game space is displayed on the TV 2. After the game image is displayed, processing in step S51 is executed.

In step S51, the CPU 10 obtains operation data 62 from the controller 5. The processing in step S51 is substantially the same as that of step S41. Next in step S52, the CPU 10 determines a motion of the racing car based on the operation made on the controller 5. The motion of the racing car is determined based on data 621 through 623 included in the operation data 62 obtained in step S51. For example, the motion of the racing car may be determined in substantially the same manner as the motion of the remote control car 71. Namely, when the operation data 62 indicates that the A button 32d has been pressed, the racing car is caused to perform an acceleration motion, which corresponds to the motion of turning on the accelerator of the remote control car 71. Like in step S42, the angle of the steering wheel of the racing car is calculated based on the marker coordinate set data 621, and the racing car is caused to perform a motion of changing the proceeding direction by the angle corresponding to the angle of the steering wheel.

Next in step S53, the CPU 10 stores input history data. In this embodiment, two types of data, i.e., data indicating whether or not the racing car has performed the acceleration motion, and data representing the angle of the steering wheel, are stored on the main memory 13 as the input history data 635. In this embodiment, while the processing loop of steps S51 through S55 is being executed, the input history data 635 is additionally stored each time step S53 is performed. Namely, the two types of data generated during the processing loop are all stored in the order of being generated. In this way, the history of inputs made while the processing loop of steps S51 through S55 is executed is stored.

Next in step S54, the CPU 10 causes the TV 2 to display a game image representing the motion of the racing car determined in step S52. By executing the processing in step S54 for each frame, the motion of the racing car moving on the race course in the game space is displayed on the TV 2.

Next in step S55, the CPU 10 determines whether or not to terminate the race game. The determination in step S55 is made based on, for example, whether or not the racing car operated by the player has reached the goal or whether or not a predetermined time duration has passed since the race game was started. When the determination result in step S55 is positive, processing in steps P56 through S58 is executed. By contrast, when the determination result in step S55 is negative, the processing returns to step S51.

In steps S56 and S57, the remote control car 71 is controlled based on the operation made on the racing car during the race game in steps S51 through S55. In step S56, the CPU 10 determines the instruction to be given to the remote control car 71 based on the input history data 635 stored on the main memory 13. As described above, in this embodiment, the two types of data, i.e., data indicating whether or not the racing car has performed the acceleration motion, and data representing the angle of the steering wheel, are stored on the main memory 13 as the input history data 635. Thus, the two types of data are used as they are as data representing the instruction. In another embodiment, data representing the history of the positions and speeds of the racing car may be stored as the input history data, and data representing the instruction may be calculated based on the input history data. The input history data 635 includes a plurality of pieces of data representing an input for each frame. Therefore, in step S56, the instruction is determined in correspondence with each piece of data. Namely, in step S56, a series of instructions are determined in correspondence with a series of inputs made during the race game processing.

In step S57, the CPU 10 selects signal patterns of the infrared signals corresponding to the instructions determined in step S56. Since the series of instructions are determined in step S56, a plurality of signal patterns are selected in correspondence with the series of instructions in step S57. The processing of selecting a signal pattern corresponding to each instruction is substantially the same as that of step S44.

In step S58, the CPU 10 causes the infrared LEDs 6Ra and 6La included in the sensor bar 6 to output infrared signals of the signal patterns selected in the steps S57. Since a plurality of signal patterns are selected in step S57, a plurality of infrared signals corresponding thereto are output one by one at a predetermined interval. After step S58, the CPU 10 terminates the race game processing shown in FIG. 24. Thus, the game processing shown in FIG. 20 is terminated.

As described above, according to the game processing shown in FIG. 20, the player can create a race course in the game space by operating the remote control car 71 before starting the race game. Owing to this, the motion of the remote control car 71 in the real world and the game course in the virtual game world can be associated with each other. Thus, a game having a new type of entertaining factor by which the motion of the control target device in the real world is reflected on the game can be provided.

According to the game processing shown in FIG. 20, the game processing is executed after the remote control car 71 is operated. Alternatively, the operation on the remote control car 71 and the game processing may be performed at the same time. Namely, the game apparatus 3 may control the remote control car 71 and the racing car at the same time by operating the controller 5. Hereinafter, game processing when the remote control car 71 and the racing car are controlled at the same time will be described with reference to FIG. 25.

Figure 25:
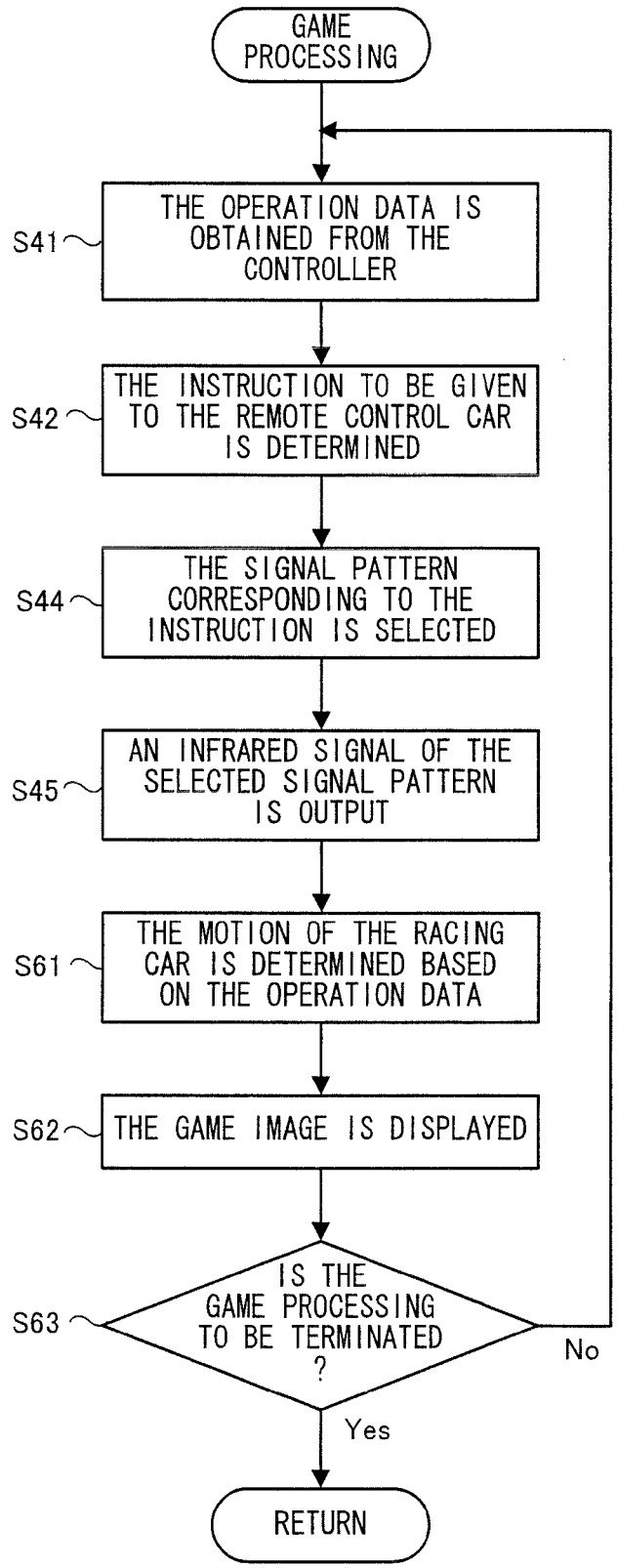
FIG. 25 is a flowchart illustrating another game processing (step S9) shown in FIG. 16 in detail.

FIG. 25 is a flowchart illustrating another example of the game processing (step S9) shown in FIG. 16 in detail. In FIG. 25, identical steps as those of FIG. 21 bear identical step numbers thereto and detailed descriptions thereof will be omitted. In the game processing shown in FIG. 25, like in the processing shown in FIG. 24, a race course is constructed in the game space in accordance with the race course data 636 stored on the main memory 13, and a game image representing a part or the entirety of the game space and the character appearing in the game space is displayed on the TV 2. After the game image is displayed, the processing shown in FIG. 25 is executed.

As shown in FIG. 25, in step S41, operation data 62 is obtained from the controller 5. Next in step S42, the instruction to be given to the remote control car 71 is determined based on the operation made on the controller 5. In the processing shown in FIG. 25, the processing in step S43 is not executed.

After step S42, the processing in step S44 is executed. In step S44, a signal pattern of the infrared signal corresponding to the instruction determined in step S42 is selected. Next in step S45, an infrared signal of the signal pattern selected in step S44 is output by the LEDs 6Ra and 6La included in the sensor bar 6.

After step S45, processing in step S61 is executed. In step S61, the CPU 10 determines the motion of the racing car based on the operation made on the controller 5. The processing in step S61 is substantially the same as that of step S52 shown in FIG. 24. In step S61, the motion of the character may be determined based on the instruction determined in step S42, instead of the operation made on the controller 5, i.e., the operation data 62 stored on the main memory 13.

In FIG. 25, an infrared signal (remote control signal) of a predetermined pattern is output in step S45 from the markers 6R and 6L. Namely, the markers 6R and 6L are lit up and turned off repeatedly. It is assumed here that the imaging element 40 of the controller 5 takes an image of the markers 6R and 6L while the remote control signal is being output. The interval of the markers 6R and 6L being lit up and turned off as the remote control signal is generally very short, and so the imaging element 40 does not sense that the markers 6R and 6L are lit up and turned off. Therefore, even while the remote control signal is being output from the markers 6R and 6L, the imaging element 40 is capable of taking an image of the markers 6R and 6L. Even if the remote control signal is output from the markers 6R and 6L during the game processing executed using the taken image of the markers 6R and 6L (step S61) as in this embodiment, the game processing is considered not to be influenced.

In this embodiment, the remote control signal is output even in the game processing mode. In another embodiment, the remote control signal may be set not to be output in the game processing mode in order to obtain more accurate information. Namely, the game processing may be executed using the imaging information only while the infrared light is continuously output.

After step S61, in step S62, the CPU 10 causes the TV 2 to display a game image representing the racing car performing the motion determined in step S61. The processing in step S62 is substantially the same as that of step S54. Next in step S63, the CPU 10 determines whether or not to terminate the game processing. The determination in step S63 is made based on, for example, whether or not the racing car operated by the player has reached the goal, or whether or not a predetermined time duration has passed since the race game was started. When the determination result in step S63 is positive, the CPU 10 terminates the game processing shown in FIG. 25. By contrast, when the determination result in step S63 is negative, the processing returns to step S41.

As described above, according to the game processing shown in FIG. 25, at the same time as the motion of the control target device (remote control car 71) is controlled based on the operation made on the controller 5 (step S45), the motion of the character (racing car) in the game space is controlled based on the operation made on the controller 5 (step S61). Therefore, a game having a new type of entertaining factor by which the player can operate the control target device in the real world at the same time as operating the character in the game space can be provided.

In the above embodiment, the race game is used for an example of the game processing. The present technology is applicable to any game as long as the game processing is executed in accordance with the operation made on the controller 5. For example, the motion of another control target device (e.g., TV 2) may be controlled with a command selection screen image during the game. Hereinafter, game processing according to a different embodiment of the present technology will be described with reference to FIG. 26 and FIG. 27.

Figure 26:
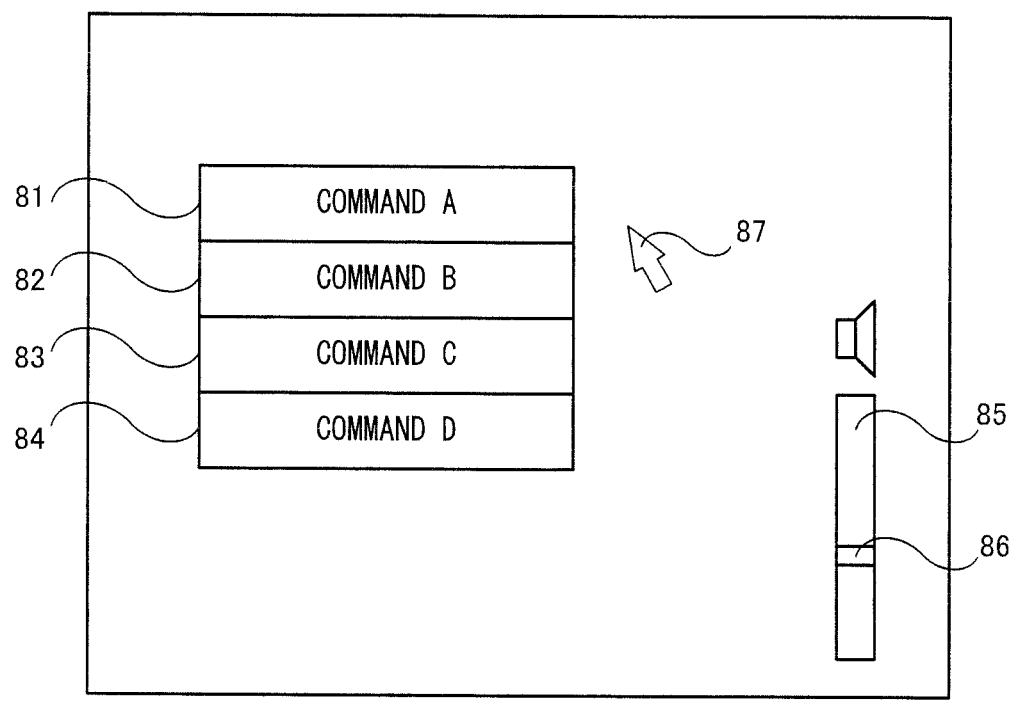
FIG. 26 shows an exemplary command selection screen image displayed in game processing in another embodiment of the present technology.

FIG. 26 shows an exemplary command selection screen image displayed in the game processing according to a different embodiment. As shown in FIG. 26, the screen of the TV 2 displays command images 81 through 84 representing commands A through D which can be indicated by the player, an gauge image 85 and a knob image 86 representing the sound volume of the TV 2, and a cursor 87 for designating the image on the screen. The player can designate one of the command images 81 through 84 using the cursor 87 to indicate the command corresponding to the designated command image. The player can also move the knob image 86 up and down in the gauge image 85 using the cursor 87 to indicate the sound volume. The cursor 87 is moved by an operation of changing the indicated position by the controller 5.

Figure 27:
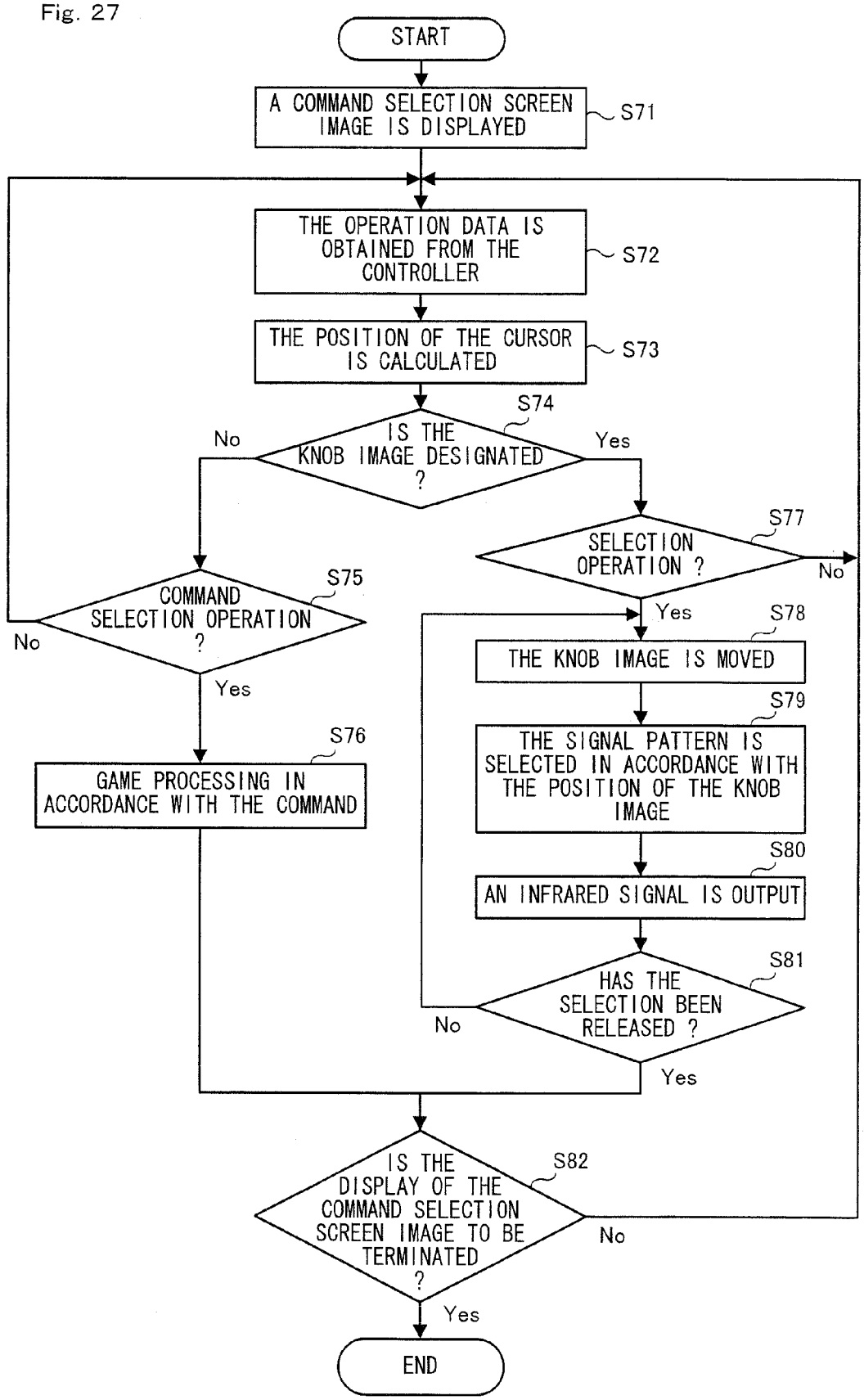
FIG. 27 is a flowchart illustrating a flow of the game processing in the embodiment shown in FIG. 26.

FIG. 27 is a flowchart illustrating a flow of the game processing in the embodiment shown in FIG. 26. With reference to FIG. 27, the game processing when the command selection screen image is displayed at an appropriate timing during the game (for example, when the player makes a predetermined indication) will be described and the other game processing irrelevant to the present technology will be omitted.

The game processing shown in FIG. 27 is executed as follows. First in step S71, the CPU 10 causes the TV 2 to display a command selection screen image. Next in step S72, the CPU 10 obtains operation data 62 from the controller 5. The processing in step S72 is substantially the same as that of step S41.

Next in step S73, the CPU 10 calculates the position at which the cursor 87 is to be displayed, using the marker coordinate set data 621 included in the operation data 62. Specifically, the indicated position by the controller 5 is calculated based on the marker coordinate sets, and the position at which the cursor 87 is to be displayed is set at the calculated indicated position.

Next in step S74, the CPU 10 determines whether or not the knob image 86 is designated by the cursor 87. The determination in step S74 is made based on whether or not the position at which the cursor 87 is displayed is within a predetermined distance from the area in which the knob image 86 is displayed. When the determination result in step S74 is positive, processing in step S77 is executed as described later. By contrast, when the determination result in step S74 is negative, the processing in step S75 is executed.

In step S75, the CPU 10 determines whether or not the player has performed a command selection operation. Herein, the "command selection operation" means an operation of pressing the A button 32d of the controller 5 in the state where one of the command selection images 81 through 84 is designated by the cursor 87. When the determination result in step S75 is positive, processing in step S76 is executed. By contrast, when determination result in step S75 is negative, the processing returns to step S72.

In step S76, the CPU 10 executes game processing in accordance with the command selected in step S75. The specific content of the command may be anything which is related to the situation in the game or the setting of the game. After step S76, processing in step S86 is executed as described later.

In step S77, the CPU 10 determines whether or not the operation of selecting the knob image 86 by the cursor 87 has been performed. Herein, the "operation of selecting the knob image 86 by the cursor 87" is the operation of pressing the A button 32d of the controller 5 in the state where the knob 86 is designated by the cursor 87. In step S77, it is determined whether or not the A button 32d has been pressed. When the determination result in step S77 is positive, processing in step S78 is executed. By contrast, when determination result in step S77 is negative, the processing returns to step S72.

In step S78, the CPU 10 moves the knob image 86 in accordance with the position of the cursor 87. Specifically, the knob image 86 is moved up and down in the gauge image 85 in accordance with the position at which the cursor 87 is displayed.

Next in step S79, the CPU 10 selects a signal pattern in accordance with the position of the knob image 86 moved in step S78. Namely, the CPU 10 determines the sound volume of the TV 2 to be set, in accordance with the position of the knob image 86, and selects a signal pattern corresponding to the instruction for setting the sound volume as determined. Next in step S80, the CPU 10 causes the LEDs 6Ra and 6La included in the sensor bar 6 to output an infrared signal of the signal pattern selected in step S79. By the infrared receiving section 52 of the TV 2 receiving the output infrared signal, the sound volume of the TV 2 is set.

In step S81, the CPU 10 determines whether or not the knob image 86 has been released from the selection by the cursor 87. The determination in step S81 is made based on whether or not the A button 32d has been lifted. When the determination in step S81 is positive, processing in step S82 is executed. By contrast, when the determination in step S81 is negative, the processing returns to step S78.

In step S82, the CPU 10 determines whether or not to terminate the display of the command selection screen image. The determination in step S82 is made based on, for example, whether or not the player has made a predetermined indication of terminating the display of the command selection screen image. When the determination in step S82 is positive, the CPU 10 terminates the game processing shown in FIG. 27. By contrast, when the determination in step S82 is negative, the processing returns to step S72.

By such processing, the player can press the A button 32d in the state where the cursor 87 is aligned to the position of the knob image 86 to move the knob image 86 up and down while the A button 32d is pressed. By moving the knob image 86 by the cursor 87, the player can change the sound volume of the TV 2. In addition, the player can press the A button in the state where the cursor 87 is aligned to one of the command images 81 through 84 to execute the command corresponding to the command image. As shown in FIG. 27, while the game processing is being executed, either the game operation or the remote control operation may be selectively performed.

In the above embodiment, the TV and the remote control car are the control target devices. In another embodiment, the control target device may be any device, the motion of which is controllable by an infrared remote control signal. For example, the control target device may be a home-use electric appliance such as an air conditioner or the like located in the same room as the game system, or may be a robot performing the same motion as the character appearing in the game space.

In the above embodiment, the infrared signal which is output from each of the markers 6R and 6L represents an instruction for causing the control target device to perform a predetermined motion, i.e., is a remote control signal. In another embodiment, the infrared signal may be any signal usable in the control target device, and may represent an image or a sound to be reproduced by the control target device or represent parameter data usable by the control target device. Even when the infrared signal represents only an image or a sound, when the control target device receiving the infrared signal reproduces the image or the sound, such an infrared signal represents an instruction for causing the control target device to perform a predetermined motion (reproduction). Even when the infrared signal represents the parameter data, when the control target device receiving the infrared signal executes predetermined processing using the parameter data, such an infrared signal represents an instruction for causing the control target device to perform a predetermined motion (processing). Hereinafter, with reference to FIG. 28, a modification of the embodiment described above with reference to FIG. 1 through FIG. 24 will be described.

Figure 28:
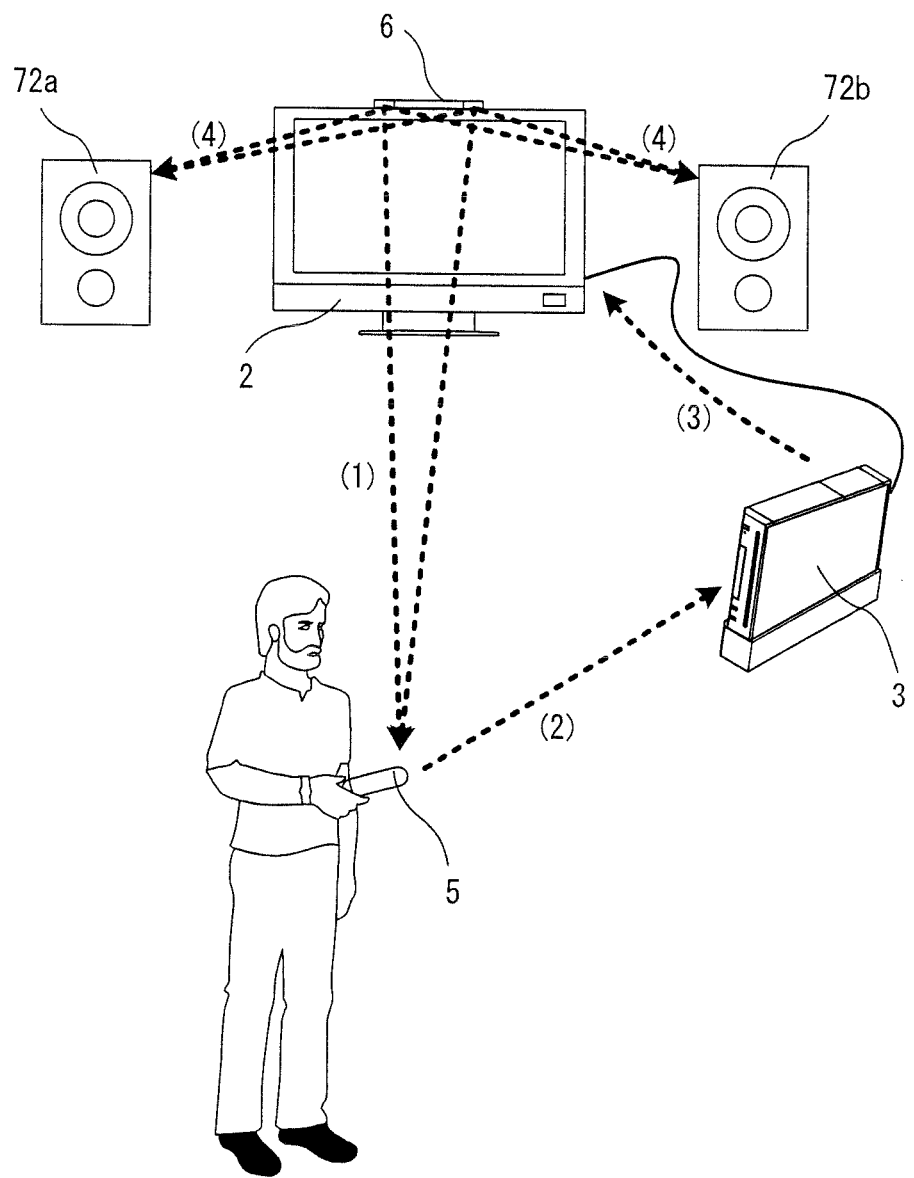
FIG. 28 shows a modified embodiment of the present technology.

FIG. 28 shows the modification. In FIG. 28, speakers 72a and 72b are the control target devices. The speakers 72a and 72b each include an infrared receiving section, and receives an audio signal transmitted as an infrared signal and outputs the received audio signal as a sound. In the modification shown in FIG. 28, storage means of the game apparatus 3 (the main memory 13, the flash memory 18, or the like) stores at least one signal pattern representing an audio signal to be reproduced through the speakers 72a and 72b. Like in the above embodiment, the controller 5 takes an image of the markers 6R and 6L (arrows (1) in FIG. 28), and transmits operation data including information on the taken image (specifically, information on the marker coordinate sets) to the game apparatus 3 (arrow (2) in FIG. 28). Based on the received operation data, the game apparatus 3 specifies an operation made on the controller 5. When an operation for causing the speakers 72a and 72b (or either the speaker 72a or 72b) to output a sound is performed on the controller 5, the game apparatus 3 determines the signal pattern representing the audio signal to be reproduced, based on the operation. The game apparatus 3 outputs the determined signal pattern to the markers 6R and 6L (arrow (3) in FIG. 28). In this way, the infrared signal as the audio signal is radiated from the markers 6R and 6L, and the speakers 72a and 72b receive the infrared signal (arrows (4) in FIG. 28). As a result, the sound represented by the received infrared signal is reproduced through the speakers 72a and 72b. Thus, the game apparatus 3 can cause the control target device to reproduce a sound in accordance with the operation made on the controller 5. In FIG. 28, the audio signal to be reproduced by the control target device is output as an infrared signal. Alternatively, an image signal may be output as an infrared signal from a display such as a monitor or the like used as the control target device.

One example of the game using the structure shown in FIG. 28 is a shooting game. In such a shooting game, the player presses a predetermined shooting button (for example, the A button 32d) provided in the controller 5. Then, the game apparatus 3 radiates an infrared signal of a signal pattern representing the audio data corresponding to a shooting sound from the markers 6R and 6L. Thus, the shooting sound is reproduced from the speakers 72a and 72b. As described above, according to this embodiment, an infrared signal as an audio signal is output from the markers 6R and 6L in accordance with the operation made on the controller 5, so that the control target device (speaker) can reproduce a sound. In the shooting game, an image of the game space may be displayed on the screen of the TV 2 and the indicated position by the controller 5 may be used as the aim.

The "parameter data usable by the control target device" is, for example, data on a game parameter in the case where the control target device is a game apparatus different from the gate apparatus 3. For example, an infrared signal, representing data on the parameter to be set for the character appearing in the game which is executed by the game apparatus as the control target device, may output from the markers 6R and 6L. At this point, the game apparatus as the control target device receives the infrared signal and stores the data representing the received infrared signal. The stored data is used for the game processing at an appropriate timing.

As described above, the present embodiments are applicable to, for example, a game apparatus used for a game system for the purpose of, for example, using an input device of the game apparatus to operate another device.

While the example embodiments have been described in detail, the foregoing description is in all aspects illustrative and not restrictive. It is understood that numerous other modifications and variations can be devised without departing from the scope of the embodiments.

The invention claimed is:

1. An information processing apparatus for use with a display device, comprising:
    a handheld control unit having manually operable controls thereon and having an inertial sensor therein, the inertial sensor providing an output indicating at least aspects of orientation of the handheld control unit for use in positioning objects on displays of the display device;
    a processing unit operatively coupled to the handheld control unit and the manually operable controls; and
    a radiation emitter operatively coupled to the processing unit;
    the processing unit controlling the radiation emitter to emit a patterned radiation signal corresponding to a command, the patterned radiation signal remotely controlling at least the display device, the processing unit selecting the patterned radiation signal from a plurality of patterned radiation signals corresponding to different display device commands.

2. The information processing apparatus of claim 1, wherein
    the radiation emitter is an infrared light emitter.

3. A method of operating an information processing apparatus for use with a display device, the information processing apparatus comprising a processing unit and a handheld control unit having manually operable controls thereon and having an inertial sensor therein, the inertial sensor providing an output indicating at least aspects of orientation of the handheld control unit for use in positioning objects on displays of the display device, the method comprising:
    (a) operatively coupling the processing unit to the handheld control unit and the manually operable controls;
    (b) operatively coupling a radiation emitter to the processing unit:
    (c) the processing unit controlling the radiation emitter to emit a patterned radiation signal corresponding to a command, the patterned radiation signal remotely controlling at least the display device, and selecting the patterned radiation signal from a plurality of patterned radiation signals corresponding to different display commands.

4. The method of operating an information processing apparatus for use with a display device according to claim 3, wherein the radiation emitter is an infrared light emitter.

5. A non-transitory computer-readable physical storage medium having tangibly recorded thereon an information processing program executable by a computer of an information processing apparatus, the information processing apparatus comprising a handheld control unit having manually operable controls thereon and having an inertial sensor therein, the inertial sensor providing an output indicating at least aspects of orientation of the handheld control unit for use in positioning objects on displays of a display device, the information processing program causing the computer to execute:

(a) operatively coupling the computer to the handheld control unit and the manually operable controls;

(b) operatively coupling a radiation emitter to the computer:

(c) the computer controlling the radiation emitter to emit a patterned radiation signal corresponding to a command, the patterned radiation signal remotely controlling at least the display device, and selecting the patterned radiation signal from a plurality of patterned radiation signals corresponding to different display commands.

6. The non-transitory computer-readable physical storage medium according to claim 5, wherein the radiation emitter is an infrared light emitter.

7. An information processing system comprising:

a display device;

a handheld control unit having manually operable controls thereon and having an inertial sensor therein, the inertial sensor providing an output indicating at least aspects of orientation of the handheld control unit for use in positioning objects on displays of the display device;

a processing unit operatively coupled to the handheld control unit and the manually operable controls; and a radiation emitter operatively coupled to the processing unit;

the processing unit controlling the radiation emitter to emit a patterned radiation signal corresponding to a command, the patterned radiation signal remotely controlling at least the display device, the processing unit selecting the patterned radiation signal from a plurality of patterned radiation signals corresponding to different display device commands.

8. The information processing system according to claim 7, wherein the radiation emitter is an infrared light emitter.

* * * * *